United States Patent
Wang

(10) Patent No.: US 11,831,895 B2
(45) Date of Patent: Nov. 28, 2023

(54) SUBLAYER SIGNALING IN A VIDEO BITSTREAM

(71) Applicant: Bytedance Inc., Los Angeles, CA (US)

(72) Inventor: Ye-kui Wang, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/076,045

(22) Filed: Dec. 6, 2022

(65) Prior Publication Data

US 2023/0100470 A1   Mar. 30, 2023

Related U.S. Application Data

(63) Continuation of application No. PCT/US2021/036253, filed on Jun. 7, 2021.

(60) Provisional application No. 63/036,365, filed on Jun. 8, 2020.

(51) Int. Cl.
| | |
|---|---|
| *H04N 19/46* | (2014.01) |
| *H04N 19/146* | (2014.01) |
| *H04N 19/70* | (2014.01) |
| *H04N 19/172* | (2014.01) |
| *H04N 19/30* | (2014.01) |

(52) U.S. Cl.
CPC ........... *H04N 19/46* (2014.11); *H04N 19/146* (2014.11); *H04N 19/172* (2014.11); *H04N 19/30* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 9,942,545 B2 | 4/2018 | Kwon et al. | |
| 2013/0077681 A1 | 3/2013 | Chen et al. | |
| 2015/0237356 A1 | 8/2015 | Wu et al. | |
| 2016/0057441 A1 | 2/2016 | Skupin et al. | |
| 2019/0052910 A1* | 2/2019 | Deshpande | H04N 19/423 |
| 2020/0077107 A1* | 3/2020 | Deshpande | H04N 19/172 |

(Continued)

OTHER PUBLICATIONS

Document: JCTVC-AC1005-v2, Boyce, J., et al., "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11 29th Meeting: Macao, CN, Oct. 19-25, 2017, 56 pages.

(Continued)

*Primary Examiner* — Kaitlin A Retallick
(74) *Attorney, Agent, or Firm* — Conley Rose, P.C.

(57) ABSTRACT

Several techniques for video encoding and video decoding are described. One example method includes performing a conversion between a video and a bitstream of the video including one or more output layer sets (OLSs) according to a rule. The rule specifies that a subpicture level information (SLI) supplemental enhancement information (SEI) message includes information about a level of subpicture sequences in a set of coded video sequences of the one or more OLSs to which the SLI SEI message applies. A syntax structure of the SLI SEI message includes at least (1) a first syntax element specifying a maximum number of sublayers for the subpicture sequences and (2) a second syntax element specifying whether level information for the subpicture sequences is present for one or more sublayer representations.

19 Claims, 13 Drawing Sheets

(56) References Cited

U.S. PATENT DOCUMENTS

| | | |
|---|---|---|
| 2020/0177922 A1 | 6/2020 | Chujoh et al. |
| 2022/0191543 A1 | 6/2022 | He |
| 2023/0037902 A1* | 2/2023 | Sánchez De La Fuente ............... H04N 19/15 |

OTHER PUBLICATIONS

Series H: Audiovisual and Multimedia Systems Infrastructure of audiovisual services—Coding of moving video High efficiency video coding ITU-T and ISO/IEC, "High efficiency video coding", Rec. ITU-T H.265 | ISO/IEC 23008-2 (in force edition), Nov. 2019, 712 pages.

Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13- 21, 2017, 50 pages.

Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.

Document: JVET-S0152-v5, Wang, Y., et al., "AHG2: Editorial input of a text integration for the May 2020 HLS AHG meeting outcome," Joint Video Experts Team (JVET) of ITU-T SG 16 WP 3 and ISO/IEC JTC 1/SC 29/WG 11 19th Meeting: by teleconference, Jun. 22-Jul. 1, 2020, 5 pages.

Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

VTM software, Retrieved from the internet: https://vcgit.hhi.fraunhofer.de/jvet/VVCSoftware_VTM.git, Feb. 22, 2023, 3 pages.

Foreign Communication From A related Counterpart Application, International Application No. PCT/US2021/036253, International Search Report dated Sep. 17, 2021, 15 pages.

Foreign Communication From A related Counterpart Application, International Application No. PCT/US2021/036254, International Search Report dated Sep. 10, 2021, 14 pages.

Foreign Communication From A related Counterpart Application, International Application No. PCT/US2021/036257, International Search Report dated Sep. 29, 2021, 14 pages.

Non-Final Office Action dated Mar. 24, 2023, 17 pages, U.S. Appl. No. 18/076,085, filed Dec. 6, 2022.

Document: JVET-S0152-v4, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020 531 pages, pp. 443-486.

Document: JVET-S0098, Skupin, R., et al., "AHG9/12: On subpicture conformance," Joint Video Experts Team (JVET) of ITU-T SG 16 WP 3 and ISO/IEC JTC 1/SC 29/WG 11 19th Meeting: by teleconference, Jun. 22-Jul. 1, 2020, 7 pages.

Document: JVET-S0176-v1, Wang, Y., et al.,"AHG9: On the subpicture level information SEI message," Joint Video Experts Team (JVET) of ITU-T SG 16 WP 3 and ISO/IEC JTC 1/SC 29/WG 11 19th Meeting: by teleconference, Jun. 22-Jul. 1, 2020, 6 pages.

Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 531 pages.

Foreign Communication From A Related Counterpart Application, European Application No. 21822302.2, Extended European Search Report dated Sep. 25, 2023, 11 pages.

* cited by examiner

1400 performing a conversion between a current access unit of a video comprising one or more output layer sets (OLSs) and a bitstream of the video according to a rule specifying that a subpicture level information (SLI) supplemental enhancement information (SEI) message remains persistent in a decoding order from the current access unit until an end of the bitstream or until a next access unit containing a subsequent SLI SEI message that includes different content than the SLI SEI message — 1410

FIG. 14

SUBLAYER SIGNALING IN A VIDEO BITSTREAM

CROSS REFERENCE TO RELATED APPLICATIONS

This application is a continuation of International Application No. PCT/US2021/036253 filed on Jun. 7, 2021, which claims the priority to and benefits of U.S. Provisional Patent Application No. 63/036,365 filed on Jun. 8, 2020. For all purposes under the law, the entire disclosure of the aforementioned application is incorporated by reference as part of the disclosure of this application.

TECHNICAL FIELD

The present disclosure relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses techniques that can be used by video encoders and decoders for processing coded representation of a video or an image.

In one example aspect, a method of processing video data is disclosed. The method includes performing a conversion between a video and a bitstream of the video comprising one or more output layer sets (OLSs) according to a rule. The rule specifies that a subpicture level information (SLI) supplemental enhancement information (SEI) message includes information about a level of subpicture sequences in a set of coded video sequences of the one or more OLSs to which the SLI SEI message applies. A syntax structure of the SLI SEI message includes (1) a first syntax element specifying a maximum number of sublayers for the subpicture sequences, (2) a second syntax element specifying whether level information for the subpicture sequences is present for one or more sublayer representations, and (3) a loop for a number of sublayers each associated with a fraction of a bitstream level limit and a level indicator indicating a level to which each subpicture sequence conforms.

In another example aspect, a method of processing video data is disclosed. The method includes performing a conversion between a current access unit of a video comprising one or more output layer sets (OLSs) and a bitstream of the video according to a rule. The rule specifies that a subpicture level information (SLI) supplemental enhancement information (SEI) message includes information about a level of subpicture sequences in a set of coded video sequences of the one or more OLSs to which the SLI SEI message applies. The SLI SEI message remains persistent in a decoding order from the current access unit until an end of the bitstream or until a next access unit containing a subsequent SLI SEI message that includes different content than the SLI SEI message.

In another example aspect, a method of processing video data is disclosed. The method includes performing a conversion between a current access unit of a video comprising one or more output layer sets (OLSs) and a bitstream of the video according to a rule. A subpicture level information (SLI) supplemental enhancement information (SEI) message includes information about a level of subpicture sequences in a set of coded video sequences of the one or more OLSs to which the SLI SEI message applies. Layers in the one or more OLSs for which a variable in a referenced sequence parameter set indicating that a number of subpictures is greater than 1 are referred to as multi-subpicture layers. Coded video sequences in the set of the OLSs are referred to as target coded video sequences (CVSs). The rule specifies that a subpicture sequence includes (1) all subpictures within the target CVSs that have a same subpicture index and belong to layers in the multi-subpicture layers, and (2) all subpictures in the target CVSs that have a subpicture index of 0 and belong to layers of the OLSs but not in the multi-subpicture layers.

In another example aspect, a video processing method is disclosed. The method includes performing a conversion between a video comprising one or more video sublayers and a coded representation of the video, wherein the coded representation conforms to a format rule; wherein the format rule specifies to include a syntax structure that loops over a number of sublayers in the coded representation and one or more syntax fields indicative of each sublayer included in the syntax structure, wherein the syntax structure includes information about signaled fractions and reference level indicators.

In another example aspect, another video processing method is disclosed. The method includes performing a conversion between a video comprising one or more subpictures and a coded representation of the video, wherein the conversion uses or produces supplemental enhancement information for one or more subpicture level information.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present disclosure.

BRIEF DESCRIPTION OF DRAWINGS

FIG. 14 is a flow chart representation of another method of processing video data in accordance with one or more embodiments of the present technology.

DETAILED DESCRIPTION

Figure 2:
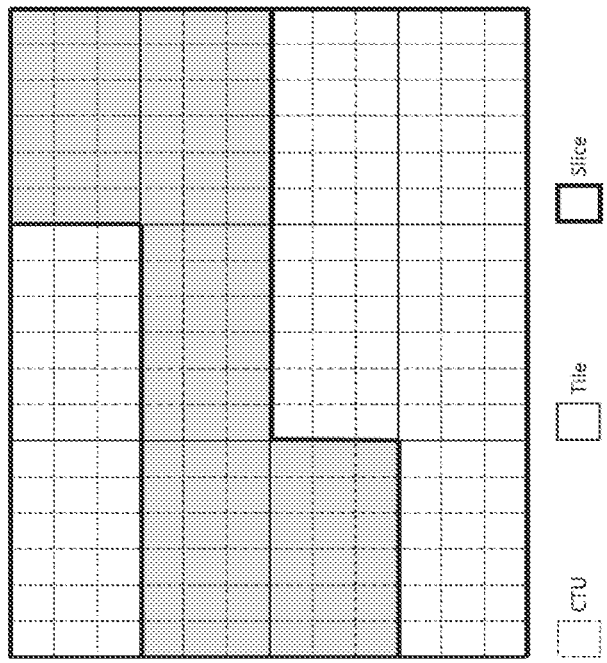
FIG. 2 shows an example of rectangular slice partitioning of a picture, where the picture is divided into 24 tiles (6 tile columns and 4 tile rows) and 9 rectangular slices.

Section headings are used in the present disclosure for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In the present disclosure, editing changes are shown to text by strikethrough indicating cancelled text and highlight indicating added text (including boldface italic), with respect to the current draft of the VVC specification.

1. OVERVIEW

This disclosure is related to video coding technologies. Specifically, it is about specifying and signaling level information for subpicture sequences. It may be applied to any video coding standard or non-standard video codec that supports single-layer video coding and multi-layer video coding, e.g., Versatile Video Coding (VVC) that is being developed.

2. ABBREVIATIONS

APS Adaptation Parameter Set
AU Access Unit
AUD Access Unit Delimiter
AVC Advanced Video Coding
BP Buffering Period
CLVS Coded Layer Video Sequence
CPB Coded Picture Buffer
CRA Clean Random Access
CTU Coding Tree Unit
CVS Coded Video Sequence
DPB Decoded Picture Buffer
DPS Decoding Parameter Set
DUI Decoding Unit Information
EOB End Of Bitstream
EOS End Of Sequence
GCI General Constraints Information
GDR Gradual Decoding Refresh
HEVC High Efficiency Video Coding
HRD Hypothetical Reference Decoder
IDR Instantaneous Decoding Refresh
IRAP Intra Random Access Point
JEM Joint Exploration Model
MCTS Motion-Constrained Tile Sets
NAL Network Abstraction Layer
OLS Output Layer Set
PH Picture Header
PPS Picture Parameter Set
PT Picture Timing
PTL Profile, Tier and Level
PU Picture Unit
RRP Reference Picture Resampling
RBSP Raw Byte Sequence Payload
SEI Supplemental Enhancement Information
SH Slice Header
SLI Subpicture Level Information
SPS Sequence Parameter Set
SVC Scalable Video Coding
VCL Video Coding Layer
VPS Video Parameter Set
VTM VVC Test Model
VUI Video Usability Information
VVC Versatile Video Coding

3. INITIAL DISCUSSION

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Picture Partitioning Schemes in HEVC

HEVC includes four different picture partitioning schemes, namely regular slices, dependent slices, tiles, and Wavefront Parallel Processing (WPP), which may be applied for Maximum Transfer Unit (MTU) size matching, parallel processing, and reduced end-to-end delay.

Regular slices are similar as in H.264/AVC. Each regular slice is encapsulated in its own NAL unit, and in-picture prediction (intra sample prediction, motion information prediction, coding mode prediction) and entropy coding dependency across slice boundaries are disabled. Thus a regular slice can be reconstructed independently from other regular slices within the same picture (though there may still have interdependencies due to loop filtering operations).

The regular slice is the only tool that can be used for parallelization that is also available, in virtually identical form, in H.264/AVC. Regular slices based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking any in-picture prediction. Basically, dependent slices provide fragmentation of regular slices into multiple NAL units, to provide reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTBs, so to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring treeblock rows within a picture is permitted, the required inter-processor/inter-core communication to enable in-picture prediction can be substantial. The WPP partitioning does not result in the production of additional NAL units compared to when it is not applied, thus WPP is not a tool for MTU size matching. However, if MTU size matching is required, regular slices can be used with WPP, with certain coding overhead.

Tiles define horizontal and vertical boundaries that partition a picture into tile columns and rows. Tile column runs from the top of a picture to the bottom of the picture. Likewise, tile row runs from the left of the picture to the right of the picture. The number of tiles in a picture can be derived simply as number of tile columns multiply by number of tile rows.

The scan order of CTBs is changed to be local within a tile (in the order of a CTB raster scan of a tile), before decoding the top-left CTB of the next tile in the order of tile raster scan of a picture. Similar to regular slices, tiles break in-picture prediction dependencies as well as entropy decoding dependencies. However, they do not need to be included into individual NAL units (same as WPP in this regard); hence tiles cannot be used for MTU size matching. Each tile can be processed by one processor/core, and the inter-processor/inter-core communication required for in-picture prediction between processing units decoding neighboring tiles is limited to conveying the shared slice header in cases a slice is spanning more than one tile, and loop filtering related sharing of reconstructed samples and metadata. When more than one tile or WPP segment is included in a slice, the entry point byte offset for each tile or WPP segment other than the first one in the slice is signaled in the slice header.

For simplicity, restrictions on the application of the four different picture partitioning schemes have been specified in HEVC. A given coded video sequence cannot include both tiles and wavefronts for most of the profiles specified in HEVC. For each slice and tile, either or both of the following conditions must be fulfilled: 1) all coded treeblocks in a slice belong to the same tile; 2) all coded treeblocks in a tile belong to the same slice. Finally, a wavefront segment contains exactly one CTB row, and when WPP is in use, if a slice starts within a CTB row, it must end in the same CTB row.

A recent amendment to HEVC is specified in the JCT-VC output document JCTVC-AC1005, J. Boyce, A. Ramasubramonian, R. Skupin, G. J. Sullivan, A. Tourapis, Y.-K. Wang (editors), "HEVC Additional Supplemental Enhancement Information (Draft 4)," Oct. 24, 2017, publicly available herein: http://phenix.int-evry.fr/jct/doc_end_user/documents/29_Macau/wg11/JCTVC-AC1005-v2.zip. With this amendment included, HEVC specifies three MCTS-related SEI messages, namely temporal MCTSs SEI message, MCTSs extraction information set SEI message, and MCTSs extraction information nesting SEI message.

The temporal MCTSs SEI message indicates existence of MCTSs in the bitstream and signals the MCTSs. For each MCTS, motion vectors are restricted to point to full-sample locations inside the MCTS and to fractional-sample locations that require only full-sample locations inside the MCTS for interpolation, and the usage of motion vector candidates for temporal motion vector prediction derived from blocks outside the MCTS is disallowed. This way, each MCTS may be independently decoded without the existence of tiles not included in the MCTS.

The MCTSs extraction information sets SEI message provides supplemental information that can be used in the MCTS sub-bitstream extraction (specified as part of the semantics of the SEI message) to generate a conforming bitstream for an MCTS set. The information consists of a number of extraction information sets, each defining a number of MCTS sets and containing RBSP bytes of the replacement VPSs, SPSs, and PPSs to be used during the MCTS sub-bitstream extraction process. When extracting a sub-bitstream according to the MCTS sub-bitstream extraction process, parameter sets (VPSs, SPSs, and PPSs) need to be rewritten or replaced, slice headers need to be slightly updated because one or all of the slice address related syntax elements (including first_slice_segment_in_pic_flag and slice_segment_address) typically would need to have different values.

3.2. Partitioning of Pictures in VVC

In VVC, A picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete CTU rows within a tile of a picture.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

Figure 1:
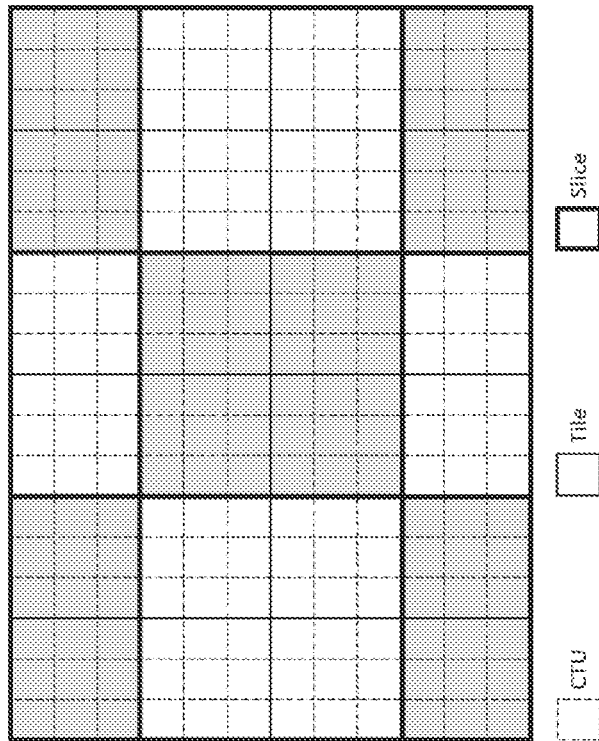
FIG. 1 shows an example of raster-scan slice partitioning of a picture, where the picture is divided into 12 tiles and 3 raster-scan slices.

FIG. 1 shows an example of raster-scan slice partitioning of a picture, where the picture is divided into 12 tiles and 3 raster-scan slices.

FIG. 2 shows an example of rectangular slice partitioning of a picture, where the picture is divided into 24 tiles (6 tile columns and 4 tile rows) and 9 rectangular slices.

Figure 3:
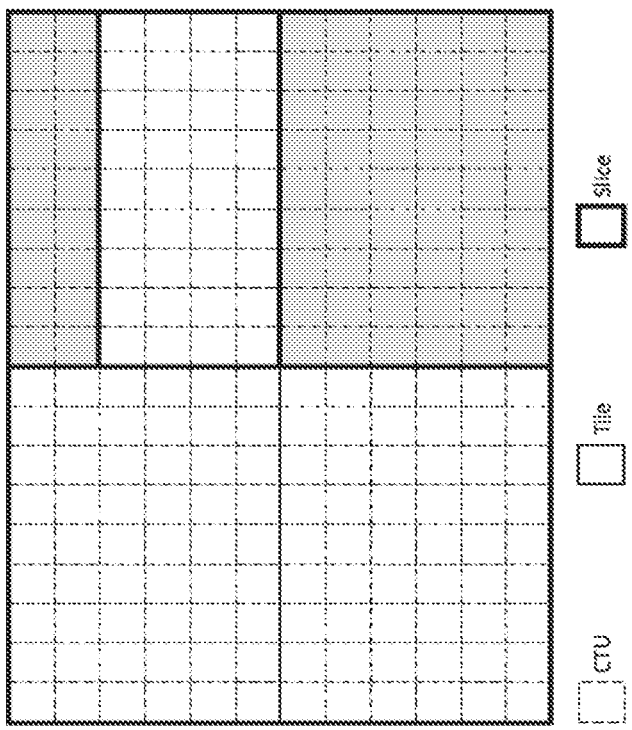
FIG. 3 shows an example of a picture partitioned into tiles and rectangular slices, where the picture is divided into 4 tiles (2 tile columns and 2 tile rows) and 4 rectangular slices.

FIG. 3 shows an example of a picture partitioned into tiles and rectangular slices, where the picture is divided into 4 tiles (2 tile columns and 2 tile rows) and 4 rectangular slices.

Figure 4:
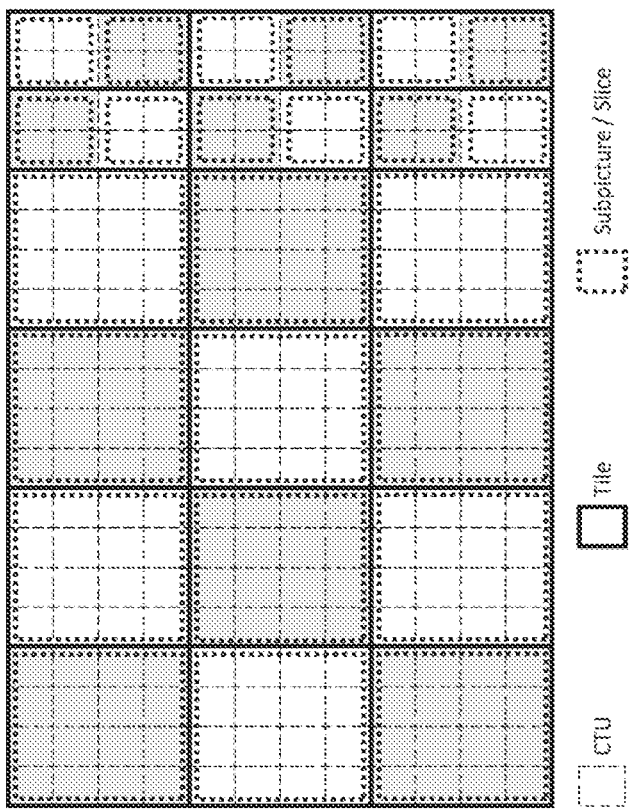
FIG. 4 shows a picture that is partitioned into 15 tiles, 24 slices and 24 subpictures.

FIG. 4 shows an example of subpicture partitioning of a picture, where a picture is partitioned into 18 tiles, 12 on the left-hand side each covering one slice of 4 by 4 CTUs and 6 tiles on the right-hand side each covering 2 vertically-stacked slices of 2 by 2 CTUs, altogether resulting in 24 slices and 24 subpictures of varying dimensions (each slice is a subpicture).

3.3. Picture Resolution Change within a Sequence

In AVC and HEVC, the spatial resolution of pictures cannot change unless a new sequence using a new SPS starts, with an IRAP picture. VVC enables picture resolution change within a sequence at a position without encoding an IRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be larger than or equal to 1/2 (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from 1/2 to 1/1.75, from 1/1.75 to 1/1.25, and from 1/1.25 to 8. Each set of resampling filters has 16 phases for luma and 32 phases for chroma which is same to the case of motion compensation interpolation filters. Actually the normal MC interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture.

Other aspects of the VVC design for support of this feature that are different from HEVC include: i) The picture resolution and the corresponding conformance window are signaled in the PPS instead of in the SPS, while in the SPS the maximum picture resolution is signaled. ii) For a single-layer bitstream, each picture store (a slot in the DPB for storage of one decoded picture) occupies the buffer size as required for storing a decoded picture having the maximum picture resolution.

3.4. Scalable Video Coding (SVC) in General and in VVC

Scalable video coding (SVC, sometimes also just referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or three dimensional (3D) extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VP S), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. E.g., the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the high level syntax (HLS)

aspects have been significantly simplified at the sacrifice of some flexibilities. For example, an TRAP AU is required to contain a picture for each of the layers present in the CVS.

3.5. Viewport-Dependent 360° Video Streaming Based on Subpictures

In streaming of 360° video, a.k.a. omnidirectional video, at any particular moment only a subset (i.e., the current viewport) of the entire omnidirectional video sphere would be rendered to the user, while the user can turn his/her head anytime to change the viewing orientation and consequently the current viewport. While it is desirable to have at least some lower-quality representation of the area not covered by the current viewport available at the client and ready to be rendered to the user just in case the user suddenly changes his/her viewing orientation to anywhere on the sphere, a high-quality representation of the omnidirectional video is only needed for the current viewport that is being rendered to the use right now. Splitting the high-quality representation of the entire omnidirectional video into subpictures at an appropriate granularity enables such an optimization. Using VVC, the two representations can be encoded as two layers that are independent from each other.

Figure 11:
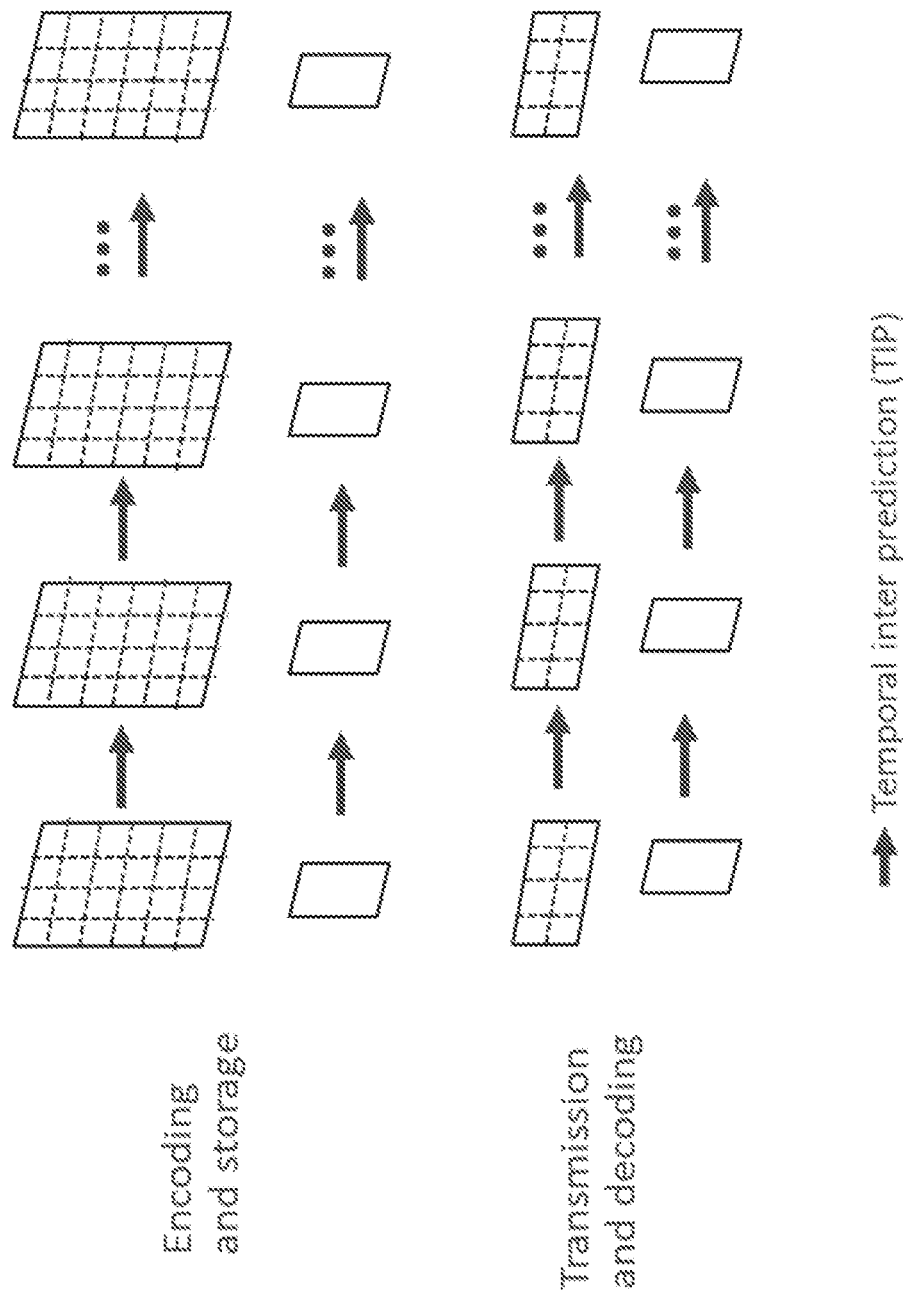
FIG. 11 shows an example of a typical subpicture-based viewport-dependent 360° video coding scheme.

A typical subpicture-based viewport-dependent 360° video delivery scheme is shown in FIG. 11, wherein a higher-resolution representation of the full video consists of subpictures, while a lower-resolution representation of the full video does not use subpictures and can be coded with less frequent random access points than the higher-resolution representation. The client receives the full video in the lower-resolution and for the higher-resolution video it only receives and decode the subpictures that cover the current viewport.

Figure 12:
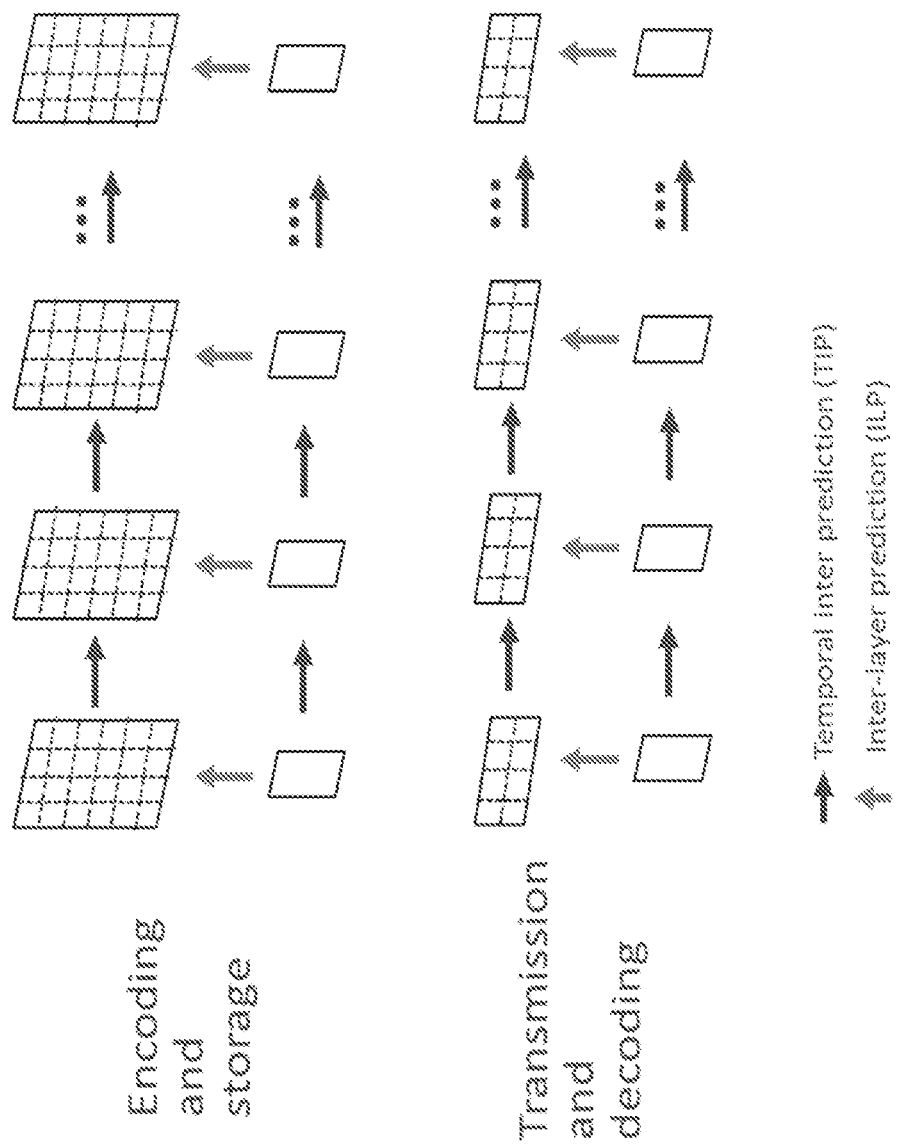
FIG. 12 shows a viewport-dependent 360° video coding scheme based on subpictures and spatial scalability.

The latest VVC draft specification also supports the improved 360° video coding scheme as shown in FIG. 12 The only difference compared to the approach shown in FIG. 11 is that inter-layer prediction (ILP) is applied for the approach shown in FIG. 12.

3.6. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signaling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.7. Profiles, Tier, and Levels

Video coding standards usually specify profiles and levels. Some video coding standards also specify tiers, e.g., HEVC and the being-developed VVC.

Profiles, tiers, and levels specify restrictions on bitstreams and hence limits on the capabilities needed to decode the bitstreams. Profiles, tiers and levels may also be used to indicate interoperability points between individual decoder implementations.

Each profile specifies a subset of algorithmic features and limits that shall be supported by all decoders conforming to that profile. Note that encoders are not required to make use of all coding tools or features supported in a profile, while decoders conforming to a profile are required to support all coding tools or features.

Each level of a tier specifies a set of limits on the values that may be taken by the bitstream syntax elements. The same set of tier and level definitions is usually used with all profiles, but individual implementations may support a different tier and within a tier a different level for each supported profile. For any given profile, a level of a tier generally corresponds to a particular decoder processing load and memory capability.

Capabilities of video decoders conforming to a video codec specification are specified in terms of the ability to decode video streams conforming to the constraints of profiles, tiers and levels specified in the video codec specification. When expressing the capabilities of a decoder for a specified profile, the tier and level supported for that profile should also be expressed.

3.8. Specifying and Signaling of Level Information for Subpicture Sequences in VVC In the latest VVC draft text, the specifying and signaling of level information for subpicture sequences in VVC are through the subpicture level information (SLI) SEI message, and a subpicture sequence can be extracted from a bitstream by applying the subpicture sub-bitstream extraction process specified in clause C.7 of VVC.

The syntax and semantics of the subpicture level information SEI message in the latest VVC draft text are as follows.

D.7.1 Subpicture Level Information SEI Message Syntax

|  | Descriptor |
|---|---|
| subpic_level_info( payloadSize) { |  |
|   sli_num_ref_levels_minus1 | u(3) |
|   sli_cbr_constraint_flag | u(1) |
|   sli_explicit_fraction_present_flag | u(1) |
|   if( sli_explicit_fraction_present flag ) |  |
|     sli_num_subpics_minus1 | ue(v) |
|   while( !byte_aligned( ) ) |  |
|     sli_alignment_zero_bit | f(1) |
|   for( i = 0; i <= sli_num_ref_levels_minus1; i++ ) { |  |
|     sli_non_subpic_layers_fraction[ i ] | u(8) |
|     sli_ref_level_idc[ i ] | u(8) |
|     if( sli_explicit_fraction_present_flag ) |  |
|       for( j = 0; j <= sli_num_subpics_minus1; j++ ) |  |
|         sli_ref_level_fraction_minus1[ i ][ j ] | u(8) |
|   } |  |
| } |  |

D.7.2 Subpicture Level Information SEI Message Semantics

The subpicture level information SEI message contains information about the level that subpicture sequences in the bitstream conform to when testing the conformance of the extracted bitstreams containing the subpicture sequences according to Annex A.

When a subpicture level information SEI message is present for any picture of a CLVS, a subpicture level information SEI message shall be present for the first picture of the CLVS. The subpicture level information SEI message persists for the current layer in decoding order from the current picture until the end of the CLVS. All subpicture level information SEI messages that apply to the same CLVS shall have the same content. A subpicture sequence consists of all subpictures within a CLVS that have the same value of subpicture index.

It is a requirement of bitstream conformance that, when a subpicture level information SEI message is present for a CLVS, the value of sps_subpic_treated_as_pic_flag[i] shall be equal to 1 for each value of i in the range of 0 to sps_num_subpics_minus1, inclusive.

sli_num_ref_levels_minus1 plus 1 specifies the number of reference levels signalled for each of the sps_num_subpics_minus1+1 subpictures.

sli_cbr_constraint_flag equal to 0 specifies that to decode the sub-bitstreams resulting from extraction of any subpicture of the bitstream according to clause C.7 by using the HRD using any CPB specification in the extracted sub-bitstream, the hypothetical stream scheduler (HSS) operates in an intermittent bit rate mode. sli_cbr_constraint_flag equal to 1 specifies that the HSS operates in a constant bit rate (CBR) mode.

sli_explicit_fraction_present_flag equal to 1 specifies that the syntax elements sli_ref_level_fraction_minus1[i] are present. sli_explicit_fraction_present_flag equal to 0 specifies that the syntax elements sli_ref_level_fraction_minus1[i] are not present.

sli_num_subpics_minus1 plus 1 specifies the number of subpictures in the pictures of the CLVS. When present, the value of sli_num_subpics_minus1 shall be equal to the value of sps_num_subpics_minus1 in the SPS referred to by the pictures in the CLVS.

sli_alignment_zero_bit shall be equal to 0.

sli_non_subpic_layers_fraction[i] specifies the fraction of the bitstream level limits associated with layers in the bitstream that have sps_num_subpics_minus1 equal to 0. When vps_max_layers_minus1 is equal to 0 or when no layer in the bitstream has sps_num_subpics_minus1 equal to 0, sli_non_subpic_layers_fraction[i] shall be equal to 0.

sli_ref_level_idc[i] indicates a level to which each subpicture conforms as specified in Annex A. Bitstreams shall not contain values of sli_ref_level_idc other than those specified in Annex A. Other values of sli_ref_level_idc[i] are reserved for future use by ITU-T ISO/IEC. It is a requirement of bitstream conformance that the value of sli_ref_level_idc[0] shall be equal to the value of general_level_idc of the bitstream and that the value of sli_ref_level_idc[i] shall be less than or equal to sli_ref_level_idc[k] for any value of i greater than 0 and k greater than i.

sli_ref_level_fraction_minus1[i][j] plus 1 specifies the fraction of the level limits associated with sli_ref_level_idc[i] that the j-th subpicture conforms to as specified in clause A.4.1.

The variable SubpicSizeY[j] is set equal to (sps_subpic_width_minus1[j]+1)*CtbSizeY*(sps_subpic_height_minus1[j]+1)*CtbSizeY.

When not present, the value of sli_ref_level_fraction_minus1[i][j] is inferred to be equal to Ceil(256*SubpicSizeY[j]÷PicSizeInSamplesY*MaxLumaPs(general_level_idc)÷MaxLumaPs(sli_ref_level_idc[i])−1.

The variable LayerRefLevelFraction[i][j] is set equal to sli_ref_level_fraction_minus1[i][j]+1.

The variable OlsRefLevelFraction[i][j] is set equal to sli_non_subpic_layers_fraction[i]+(256−sli_non_subpic_layers_fraction[i])÷256*(sli_ref_level_fraction_minus1 [i][j]+1). The variables SubpicCpbSizeVcl[i][j] and SubpicCpbSizeNal[i][j] are derived as follows:

$$\text{SubpicCpbSizeVcl}[i][j] = \text{Floor} \\ (\text{CpbVclFactor} * \text{MaxCPB} * \text{OlsRefLevelFraction} \\ [i][j] \div 256) \qquad (D.6)$$

$$\text{SubpicCpbSizeNal}[i][j] = \text{Floor} \\ (\text{CpbNalFactor} * \text{MaxCPB} * \text{OlsRefLevelFraction} \\ [i][j] \div 256) \qquad (D.7)$$

with MaxCPB derived from sli_ref_level_idc[i] as specified in clause A.4.2.

The variables SubpicBitRateVcl[i][j] and SubpicBitRateNal[i][j] are derived as follows:

$$\text{SubpicBitRateVcl}[i][j] = \text{Floor} \\ (\text{CpbVclFactor} * \text{ValBR} * \text{OlsRefLevelFraction}[0] \\ [j] \div 256) \qquad (D.8)$$

$$\text{SubpicBitRateNal}[i][j] = \text{Floor} \\ (\text{CpbNalFactor} * \text{ValBR} * \text{OlsRefLevelFraction}[0] \\ [j] \div 256) \qquad (D.9)$$

Where the value of ValBR is derived as follows:

When bit_ratevalue_minus1[Htid][ScIdx] is available in the respective HRD parameters in the VPS or SPS, ValBR is set equal to (bit_rate_value_minus1[Htid][ScIdx]+1)*$2^{(6+bit\_rate\_scale)}$, where Htid is the considered sublayer index and ScIdx is the considered schedule index.

Otherwise, ValBR is set equal to MaxBR derived from sli_ref_level_idc[0] as specified in clause A.4.2.

NOTE 1—When a subpicture is extracted, the resulting bitstream has a CpbSize (either indicated in the VPS, SPS, or inferred) that is greater than or equal to SubpicCpbSizeVcl[i][j] and SubpicCpbSizeNal[i][j] and a BitRate (either indicated in the VPS, SPS, or inferred) that is greater than or equal to SubpicBitRateVcl[i][j] and SubpicBitRateNal[i][j].

It is a requirement of bitstream conformance that each layer in the bitstream resulting from extracting the j-th subpicture for j in the range of 0 to sps_num_subpics_minus1, inclusive, from a layer that had sps_num_subpics_minus1 greater than 0 in the input bitstream to the extraction process, and conforming to a profile with general_tier_flag equal to 0 and level equal to sli_ref_level_idc[i] for i in the range of 0 to num_ref_level_minus1, inclusive, shall obey the following constraints for each bitstream conformance test as specified in Annex C:

Ceil(256*SubpicSizeY[j]÷LayerRefLevelFraction[i][j]) shall be less than or equal to MaxLumaPs, where MaxLumaPs is specified in Table A.1 for level sli_ref_level_idc[i].

The value of Ceil(256*(sps_subpic_width_minus1[j]+1)*CtbSizeY÷LayerRefLevelFraction[i][j]) shall be less than or equal to Sqrt(MaxLumaPs*8).

The value of Ceil(256*(sps_subpic_height_minus1[j]+1)*CtbSizeY÷LayerRefLevelFraction[i][j]) shall be less than or equal to Sqrt(MaxLumaPs*8).

The value of SubpicWidthInTiles[j] shall be less than or equal to MaxTileCols and of SubpicHeightInTiles[j] shall be less than or equal to MaxTileRows, where MaxTileCols and MaxTileRows are specified in Table A.1 for level sli_ref_level_idc[i].

The value of SubpicWidthInTiles[j]*SubpicHeightInTiles[j] shall be less than or equal to MaxTileCols*MaxTileRows*LayerRefLevelFraction[i][j], where MaxTileCols and MaxTileRows are specified in Table A.1 for level sli_ref_level_idc[i].

It is a requirement of bitstream conformance that the bitstream resulting from extracting the j-th subpicture for j in the range of 0 to sps_num_subpics_minus1, inclusive, and conforming to a profile with general_tier_flag equal to 0 and level equal to ref_level_idc[i] for i in the range of 0 to sli_num_ref_level_minus1, inclusive, shall obey the following constraints for each bitstream conformance test as specified in Annex C:

The sum of the NumBytesInNalUnit variables for AU 0 corresponding to the j-th subpicture shall be less than or equal to FormatCapabilityFactor*(Max(SubpicSizeY [j], fR*MaxLumaSr*OlsRefLevelFraction[i][j]÷256)+ MaxLumaSr*(AuCpbRemovalTime[0]−AuNominal-RemovalTime[0])*OlsRefLevelFraction[i][j])÷ (256*MinCr) for the value of SubpicSizeInSamplesY of AU 0, where MaxLumaSr and FormatCapability-Factor are the values specified in Table A.2 and Table A.3, respectively, that apply to AU 0, at level sli_ref_level_idc[i], and MinCr is derived as indicated in A.4.2.

The sum of the NumBytesInNalUnit variables for AU n (with n greater than 0) corresponding to the j-th subpicture shall be less than or equal to FormatCapabilityFactor*MaxLumaSr*(AuCpbRemovalTime[n]−AuCpbRemovalTime[n−1])*OlsRefLevelFraction[i][j]÷(256*MinCr), where MaxLumaSr and FormatCapabilityFactor are the values specified in Table A.2 and Table A.3 respectively, that apply to AU n, at level sli_ref_level_idc[i], and MinCr is derived as indicated in A.4.2.

The value of the subpicture sequence level indicator, SubpicLevelIdc, is derived as follows:

```
SubpicLevelIdc = general_level_idc
SubpicLevelIdx = 0
for (i = num_ref_level_minus1; i >= 1; i-- )
    if( OlsLevelFraction[ i ] <= 256 )                    (D.10)
        SubpicLevelIdc = sli_ref_level_idc[ i ]
        SubpicLevelIdx = i
    }
```

The subpicture sequence bitstream conforming to a profile with general_tier_flag equal to 0 and a level equal to SubpicLevelIdc shall obey the following constraints for each bitstream conformance test as specified in Annex C:

For the VCL BIRD parameters, SubpicCpbSizeVcl[i] shall be less than or equal to CpbVclFactor*MaxCPB, where CpbVclFactor is specified in Table A.3, and MaxCPB is specified in Table A.1 in units of CpbVcl-Factor bits.

For the NAL BIRD parameters, SubpicCpbSizeNal[i] shall be less than or equal to CpbNalFactor*MaxCPB, where CpbNalFactor is specified in Table A.3, and MaxCPB is specified in Table A.1 in units of CpbNal-Factor bits.

For the VCL BIRD parameters, SubpicBitRateVcl[i] shall be less than or equal to CpbVclFactor*MaxBR, where CpbVclFactor is specified in Table A.3, and MaxBR is specified in Table A.1 in units of CpbVclFactor bits.

For the NAL BIRD parameters, SubpicBitRateNal[i] shall be less than or equal to CpbNalFactor*MaxBR, where CpbNalFactor is specified in Table A.3, and MaxBR is specified in Table A.1 in units of CpbNalFactor bits.

NOTE 2—When a subpicture sequence is extracted, the resulting bitstream has a CpbSize (either indicated in the VPS, SPS, or inferred) that is greater than or equal to SubpicCpbSizeVcl[i][j] and SubpicCpbSizeNal[i][j] and a BitRate (either indicated in the VPS, SPS, or inferred) that is greater than or equal to SubpicBitRateVcl[i][j] and SubpicBitRateNal[i][j].

4. TECHNICAL PROBLEMS SOLVED BY DISCLOSED TECHNICAL SOLUTIONS

The existing VVC design for specifying and signaling of level information for subpicture sequences has the following problems:

(1) The SLI SEI message only signals a single set of level information for subpicture sequences regardless of the value of the highest TemporalId. However, same as bitstreams with a single subpicture per picture, different sublayer representations may conform to different levels.

(2) The SLI SEI messages are specified to be available only through being in the bitstream. However, similarly as parameter sets and the other HRD related SEI messages, the SLI SEI message should also be made available through an external means.

(3) The persistency scope of the SLI SEI message is specified to be within one CVS. However, in most cases an SLI SEI message would apply to a number of consecutive CVSs, and often the entire bitstream.

(4) The definition of subpicture sequence does not cover the case when there is one or more layers with a single subpicture per picture.

(5) A constraint is missing to require that, when an SLI SEI message is present for a CVS, the value of sps_num_subpics_minus1 shall be the same for all the SPSs referenced by the pictures in the layers with multiple subpictures per picture. Otherwise, it does not make sense to require the value of sli_num_subpics_minus1 to be equal to the value of sps_num_subpics_minus1.

(6) The semantics of sli_num_subpics_minus1 does not work with the case when there is one or more layers with multiple subpictures per picture.

(7) The variables SubpicLevelIdc and SubpicLevelIdx need to be specified to be subpicture sequence specific, as different subpicture sequences extracted from the same original bitstream can conform to different levels.

5. A LISTING OF SOLUTIONS AND EMBODIMENTS

To solve the above problems, and others, methods as summarized below are disclosed. The embodiments should be considered as examples to explain the general concepts and should not be interpreted in a narrow way. Furthermore, these embodiments can be applied individually or combined in any manner.

1) To solve the 1st problem, add sli_max_sublayers_minus1, sli_sublayer_info_present_flag, and a loop for sublayers for the signalled fractions and reference level indicators, to be consistent with the signaling of level information in PTL syntax structures.
   a. In one example, furthermore, the sli_cbr_constraint_flag is also made sublayer specific, i.e., changed to be sli_cbr_constraint_flag[k] and moved inside the loop for sublayers.
      i. In one example, furthermore, when sli_cbr_constraint_flag[k] for a lower sublayer is not present, it is inferred to be equal to sli_cbr_constraint_flag [k+1].

b. In one example, furthermore, when a fraction or reference level indicator for a lower sublayer is not present, it is inferred to be the same as for the next higher sublayer.
2) To solve the 2nd problem, allow SLI SEI messages to be available either being in the bitstream or provided through an external means, to be consistent with parameter sets and the other three conformance/HRD related SEI messages, namely the PT, BP, DUI SEI messages.
3) To solve the 3rd problem, change the persistency scope from one CVS to one or more CVSs, to be consistent with VPSs and SPSs wherein level information are or may be signalled.
4) To solve the 4th problem, change the definition of subpicture sequence to cover the case when there is one or more layers with a single subpicture per picture.
5) To solve the 5th problem, require that, when an SLI SEI message is present for a CVS, the value of sps_num_subpics_minus1 shall be the same for all the SPSs referenced by the pictures in the layers with multiple subpictures per picture.
6) To solve the 6th problem, specify the semantics of sli_num_subpics_minus1 in a way such that the syntax element is about the subpictures of the layers with multiple subpictures per picture.
7) To solve the 7th problem, add an array index, the index of a subpicture sequence, to both the variables SubpicLevelIdc and SubpicLevelIdx, as well as to the arrays SubpicCpbSizeVcl, SubpicCpbSizeNal, SubpicBitRateVcl, and SubpicBitRateNal in the last set of constraints in the semantics of the SLI SEI message.

6. EMBODIMENT EXAMPLES

Below are some example embodiments for some of the aspects summarized above in this Section, which can be applied to the VVC specification. Most relevant parts that have been added or modified are underlined in boldface italics, and some of the deleted parts are indicated using [[ ]].

6.1. Embodiment 1

This embodiment is for items 1 to 7 and some of their sub-items.

D.7.1 Subpicture Level Information SEI Message Syntax

|  | Descriptor |
|---|---|
| subpic_level_info( payloadSize ) { |  |
|     sli_num_ref_levels_minus1 | u(3) |
|     sli_cbr_constraint_flag | u(1) |
|     sli_explicit_fraction_present_flag | u(1) |
|     if( sli_explicit_fraction_present_flag ) |  |
|         sli_num_subpics_minus1 | ue(v) |
|         *sli_max_sublayers_minus1* | *u(3)* |
|         *sli_sublayer_info_present_flag* | *u(1)* |
|     while( !byte_aligned( ) ) |  |
|         sli_alignment_zero_bit | f(1) |
|     *for( k = sli_sublayer_info_present_flag ? 0 : sli_max_sublayers_minus1;* |  |
|         *k <= sli_maxsublayers_minus1; k++ )* |  |
|     for( i = 0; i <= sli_num_ref_levels_minus1; i++ ) { |  |
|         sli_non_subpic_layers_fraction[ i ]***[ k ]*** | u(8) |
|         sli_ref_level_idc[ i ]***[ k ]*** | u(8) |
|         if( sli_explicit_fraction_present_flag ) |  |
|             for( j = 0; j <= sli_num_subpics_minus1; j++ ) |  |
|                 sli_ref_level_fraction_minus1[ i ][ j ]***[ k ]*** | u(8) |
|     } |  |
| } |  |

D.7.2 Subpicture Level Information SEI Message Semantics

The subpicture level information *(SLI)* SEI message contains information about the level that subpicture sequences in the *set of CVSs of the OLSs to which the SEI message applies, denoted as targetCvss,* [[bitstream]] conform to when testing the conformance of the extracted bitstreams containing the subpicture sequences according to Annex A. *The OLSs to which the SLI message applies are also referred to as the applicable OLSs or the associated OlSs. A CVS in the remainder of this clause refers to a CVS of the applicable OLSs.*

[[When a subpicture level information SEI message is present for any picture of a CLVS, a subpicture level information SEI message shall be present for the first picture of the CLVS. The subpicture level information SEI message persists for the current layer in decoding order from the current picture until the end of the CLVS. All subpicture level information SEI messages that apply to the same CLVS shall have the same content.]]

*When an SLI SEI message is present (either being in the bitstream or provided through an external means not specified in this Specification) for any AU of a CVS, an SLI SEI message shall be present for the first AU of the CVS. The SLI SEI message persists in decoding order from the current AU until the next AU containing an SLI SEI message for which the content differs from the current SLI SEI message or the end of the bitstream. All SLI SEI messages that apply to the same CVS shall have the same content.*

*Among the layers in the applicable OLSs, those for which the referenced SPSs have sps_num_subpics_minus1 greater than 0 are referred to as the multiSubpicLayers.*

A subpicture sequence consists of all subpictures within [[a CLVS]] *targetCvss* that have the same value of subpicture index *subpicIdxA and belong to the layers in the multiSubpicLayers and all subpictures within targetCvss that have subpicture index equal to 0 and belong to the layers in the applicable OLSs but not in the multiSubpicLayers. A subpicture sequence is said to be associated with and identified by the subpicture index subpicIdxA.*

It is a requirement of bitstream conformance that, [[when a subpicture level information SEI message is present for a CLVS,]] *When an SLI SEI message is present for a CVS, for all the SPSs referenced by the pictures in the mutiSubPicLayers, the value of sps_num_subpics_minus1 shall be the same and the* value of sps_subpic_treated_as_pic_flag[i] shall be equal to 1 for each value of i in the range of 0 to sps_num_subpics_minus1, inclusive.

sli_num_ref_levels_minus1 plus 1 specifies the number of reference levels signalled for each of the sli_num_subpics_minus1+1 subpicture *sequences*.

sli_cbr_constraint_flag equal to 0 specifies that to decode the sub-bitstreams resulting from extraction of any subpicture *sequence* [[of the bitstream]] according to clause C.7 by using the HRD using any CPB specification in the extracted sub-bitstream, the hypothetical stream scheduler (HSS) operates in an intermittent bit rate mode. sli_cbr_constraint_flag equal to 1 specifies that the HSS operates in a constant bit rate (CBR) mode *in such a case*. sli_explicit_fraction_present_flag equal to 1 specifies that the syntax elements sli_ref_level_fraction_minus1[i] are present. sli_explicit_fraction_present_flag equal to 0 specifies that the syntax elements sli_ref_level_fraction_minus1[i] are not present.

sli_num_subpics_minus1 plus 1 specifies the number of subpictures in the pictures [[of the CLVS]] *in the multiSubpicLayers in targetCvss.* When present, the value of sli_num_subpics_minus1 shall be equal to the value of sps_num_subpics_minus1 in the SPSs referred to by the pictures in [[the CLVS]] *the multiSubpicLayers in targetCvss,*

*sli_max_sublayers_minus1 plus 1 specifies the maximum number of temporal sublayers in the subpicture sequences for which the level information is indicated in the SLI SEI message. The value of sli_max_sublayers_minus1 shall be in the range of 0 to vps_max_sublayers_minus1, inclusive.*

*sli_sublayer_info_present_flag equal to 1 specifies that the level information for subpicture sequences is present for sublayer representation(s) in the range of 0 to sli_max_sublayers_minus1, inclusive.*

*sli_sublayer_info_present_flag equal to 0 specifies that the level information for subpicture sequences is present for the sli_max_sublayers_minus1-th sublayer representation. When not present, the value of sli_sublayer_info_present_flag is inferred to be equal to 0.* sli_alignment_zero_bit shall be equal to 0.

sli_non_subpic_layers_fraction[i]*[ k ]* indicates the *i-th* fraction of the bitstream level limits associated with layers in [[the bitstream]] *targetCvss* that have sps_num_subpics_minus1 equal to 0 *when Htid is equal to k*. When vps_max_layers_minus1 is equal to 0 or when no layer in the bitstream has sps_num_subpics_minus1 equal to 0, sli_non_subpic_layers_fraction[i]*[ k ]* shall be equal to 0. *when k is less than sli_max_sublayers_minus1 and sli_non_subpic_layers_fraction[ i ][ k ] is not present, it is inferred to be equal to sli_non_subpic_layers_fraction[ i ][ k + 1 ].* sli_ref_level_idc[i]*[ k ]* indicates [[a]] *the i-th* level to which each subpicture *sequence* conforms as specified in Annex A *when Htid is equal to k*. Bitstreams shall not contain values of sli_ref_level_idc*[ i ][ k ]* other than those specified in Annex A. Other values of sli_ref_level_idc[i]*[ k ]* are reserved for future use by ITU-T|ISO/IEC. It is a requirement of bitstream conformance that the value of sli_ref_level_idc[0]*[ k ]* shall be equal to the value of general_level_idc of the bitstream and that the value of sli_ref_level_idc[i]*[ k ]* shall be less than or equal to sli_ref_level_idc*[ m ]* [k] for any value of i greater than 0 and km greater than i. *When k is less than sli_max_sublayers_minus1 and sli_ref_level_idc[ i ][ k ] is not present, it is inferred to be equal to sli_ref_level_idc[ i ][ k + 1 ].* sli_ref_level_fraction_minus1[i][j]*[ k ]* plus 1 specifies the *i-th* fraction of the level limits, associated with sli_ref_level_idc[i] [[that the j-th subpicture conforms to as specified in clause A.4.1]] *, for the subpictures with subpicture index equal to j in layers in*

*targetCvss that have sps num subpics minus1 greater than 0 when Htid is equal to k. When k is less than sli max sublayers minus1 and sli ref level fraction minus1[ i ][ j ][ k ] is not present, it is inferred to be equal to sli ref level fraction minus1[ i ][ j ][ k + 1 ].*

The variable SubpicSizeY[j] is set equal to (sps_subpic_width_minus1[j]+1)*CtbSizeY*(sps_subpic_height_minus1[j]+1)*CtbSizeY.

When not present, the value of sli_ref_level_fraction_minus1[i][j]*[ sli max sublayers minus1 ]* is inferred to be equal to Ceil(256*SubpicSizeY[j]÷PicSizeInSamplesY*MaxLumaPs(general_level_idc)÷MaxLumaPs(sli_ref_level_idc[i]*[ sli max sublayers minus1 ]* )−1.

The variable LayerRefLevelFraction[i][j]*[ k ]* is set equal to sli_ref_level_fraction_minus1[i][j]*[ k ]* +1.

The variable OlsRefLevelFraction[i][j]*[k]* is set equal to sli_non_subpic_layers_fraction[i]*[k]* +(256−sli_non_subpic_layers_fraction[i] [k])÷256*(sli_ref_level_fraction_minus1[i][j]*[k]* +1).

The variables SubpicCpbSizeVcl[i][j]*[k]* and SubpicCpbSizeNal[i][j]*[k]* are derived as follows:

$$\text{SubpicCpbSizeVcl}[i][j][k] = \text{Floor}(\text{CpbVclFactor}*\text{MaxCPB}*\text{OlsRefLevelFraction}[i][j][k] \div 256) \quad (D.6)$$

$$\text{SubpicCpbSizeNal}[i][j][k] = \text{Floor}(\text{CpbNalFactor}*\text{MaxCPB}*\text{OlsRefLevelFraction}[i][j][k] \div 256) \quad (D.7)$$

with MaxCPB derived from sli_ref_level_idc[i]*[k]* as specified in clause A.4.2

The variables SubpicBitRateVcl[i][j]*[k]* and SubpicBitRateNal[i][j]*[k]* are derived as follows:

$$\text{SubpicBitRateVcl}[i][j][k] = \text{Floor}(\text{CpbVclFactor}*\text{ValBR}*\text{OlsRefLevelFraction}[0][j][k] \div 256) \quad (D.8)$$

$$\text{SubpicBitRateNal}[i][j][k] = \text{Floor}(\text{CpbNalFactor}*\text{ValBR}*\text{OlsRefLevelFraction}[0][j][k] \div 256) \quad (D.9)$$

Where the value of ValBR is derived as follows:
- When bit_rate_value_minus1[[[Htid]]]*[ k ]*[ScIdx] is available in the respective HRD parameters in the VPS or SPS, ValBR is set equal to (bit_rate_value_minus1[[[Htid]]]*[ k ]*[ScIdx]+1)*$2^{(6+bit\_rate\_scale)}$, where [[Htid is the considered sublayer index and]] ScIdx is the considered schedule index.
- Otherwise, ValBR is set equal to MaxBR derived from sli_ref_level_idc[0]*[ k ]* as specified in clause A.4.2.
- NOTE 1— When a subpicture is extracted, the resulting bitstream has a CpbSize (either indicated in the VPS, SPS, or inferred) that is greater than or equal to SubpicCpbSizeVcl[i][j]*[ k ]* and SubpicCpbSizeNal[i][j]*[ k ]* and a BitRate (either indicated in the VPS, SPS, or inferred) that is greater than or equal to SubpicBitRateVcl[i][j]*[ k ]* and SubpicBitRateNal[i][j]*[ k ]*.

It is a requirement of bitstream conformance that*, for each value of k in the range of sli max sublayers minus1, inclusive,* each layer in the bitstream resulting from extracting the j-th subpicture *sequence* for j in the range of 0 to spssli_num_subpics_minus1, inclusive, from a layer that had sps_num_subpics_minus1 greater than 0 in the input bitstream to the extraction process, and conforming to a profile with general_tier_flag equal to 0 and level equal to sli_ref_level_idc[i]*[ k ]* for i in the range of 0 to *sli* num_ref_levels_minus1, inclusive, shall obey the following constraints for each bitstream conformance test as specified in Annex C:

- Ceil(256*SubpicSizeY[j]+LayerRefLevelFraction[i][j]*[ k ]*) shall be less than or equal to MaxLumaPs, where MaxLumaPs is specified in Table A.1 for level sli_ref_level_idc[i]*[k]*.
- The value of Ceil(256*(sps_subpic_width_minus1[j]+1)*CtbSizeY÷LayerRefLevelFraction[i][j]*[k]*) shall be less than or equal to Sqrt(MaxLumaPs*8).
- The value of Ceil(256*(sps_subpic_height_minus1[j]+1)*CtbSizeY÷LayerRefLevelFraction[i][j]*[k]*) shall be less than or equal to Sqrt(MaxLumaPs*8).
- The value of SubpicWidthInTiles[j] shall be less than or equal to MaxTileCols and of SubpicHeightInTiles[j] shall be less than or equal to MaxTileRows, where MaxTileCols and MaxTileRows are specified in Table A.1 for level sli_ref_level_idc[i]*[k]*.
- The value of SubpicWidthInTiles[j]*SubpicHeightInTiles[j] shall be less than or equal to MaxTileCols*MaxTileRows*LayerRefLevelFraction[i][j] [k], where MaxTileCols and MaxTileRows are specified in Table A.1 for level sli_ref_level_idc[i][k].

It is a requirement of bitstream conformance that *when Htid is equal to k,* the bitstream resulting from extracting the j-th subpicture *sequence* for j in the range of 0 to [[sps]] *sli* _num_subpics_minus1, inclusive, and conforming to a profile with general_tier_flag equal to 0 and level equal to *sli* ref_level_idc[i]*[k]* in the range of 0 to sli_num_ref_levels_minus1, inclusive, shall obey the following constraints for each bitstream conformance test as specified in Annex C:

- The sum of the NumBytesInNalUnit variables for AU 0 corresponding to the j-th subpicture *sequence* shall be less than or equal to FormatCapabilityFactor*(Max(SubpicSizeY[j], fR*MaxLumaSr*OlsRefLevelFraction[i][j]*[k]* ÷256)+MaxLumaSr*(AuCpbRemovalTime[0]−AuNominalRemovalTime[0])*OlsRefLevelFraction[i][j]*[k]* ÷(256*MinCr) for the value of SubpicSizeInSamplesY of AU 0, where MaxLumaSr and FormatCapabilityFactor are the values specified in Table A.2 and Table A.3, respectively, that apply to AU 0, at level sli_ref_level_idc[i]*[k]*, and MinCr is derived as indicated in A.4.2.
- The sum of the NumBytesInNalUnit variables for AU n (with n greater than 0) corresponding to the j-th subpicture *sequence* shall be less than or equal to FormatCapabilityFactor*MaxLumaSr*(AuCpbRemovalTime[n]−AuCpbRemovalTime[n]−1)*OlsRefLevelFraction[i][j]*[k]* ÷(256*MinCr), where MaxLumaSr and FormatCapabilityFactor are the values specified in Table A.2 and Table A.3 respectively, that apply to AU n, at level sli_ref_level_idc[i]*[ k ]*, and MinCr is derived as indicated in A.4.2.

The value of the subpicture sequence level indicator, SubpicLevelIdc *[ j ][ k ], for the i-th subpicture sequence when Htid is equal to k,* is derived as follows:

*for( j = 0; j < sli num subpics minus1; j++ )*
   SubpicLevelIdc *[ j ][ k ]* =general_level_idc
   SubpicLevelIdx *[ j ][ k ]* =0
   for(i=*sli* _num_ref_levels_minus1; i>=1; i−−)

if(Ols *Ref* LevelFraction[*i*] *[ j ][ k ]* <=256){Sub-
picLevelIdc *[ j ][ k ]* =sli_ref_level_idc[*i*]
*[ k ]* SubpicLevelIdx *[ j ][ k ]* =*i*}   (D.10)

The *j-th* subpicture [[bitstream]] *sequence* conforming to a profile with general_tier_flag equal to 0 and a level equal to SubpicLevelIdc*[ j ][ k ]* shall obey the following constraints for each bitstream conformance test as specified in Annex C *when Htid is equal to k, and the variable spLvIdx below is equal to SubpicLevelIdx[ j ][ k ]*:

For the VCL BIRD parameters, SubpicCpbSizeVcl[[[i]]]]*[ spLvIdx ][ j ][ k ]* shall be less than or equal to CpbVclFactor*MaxCPB, where CpbVclFactor is specified in Table A.3 and MaxCPB is specified in Table A.1 in units of CpbVclFactor bits.

For the NAL HRD parameters, SubpicCpbSizeNal[[[i]]] *[ spLvIdx ][ j ][ k ]* shall be less than or equal to CpbNalFactor*MaxCPB, where CpbNalFactor is specified in Table A.3, and MaxCPB is specified in Table A.1 in units of CpbNalFactor bits.

For the VCL BIRD parameters, SubpicBitRateVcl[[[i]]]]*[ spLvIdx ][ j ][ k ]* shall be less than or equal to CpbVclFactor*MaxBR, where CpbVclFactor is specified in Table A.3 and MaxBR is specified in Table A.1 in units of CpbVclFactor bits.

For the NAL HRD parameters, SubpicBitRateNal[[[i]]] *[ spLvIdx ][ j ][ k ]* shall be less than or equal to CpbNalFactor*MaxBR, where CpbNalFactor is specified in Table A.3, and MaxBR is specified in Table A.1 in units of CpbNalFactor bits.

NOTE 2—When [[a]] *the j-th* subpicture sequence is extracted *with tIdTarget equal to k*, the resulting bitstream has a CpbSize (either indicated in the VPS, SPS, or inferred) that is greater than or equal to SubpicCpbSizeVcl[[[i]][j]]*[ spLvIdx ][ j ][ k ]* and SubpicCpbSizeNal[[[i]][j]]*[ spLvIdx ][ j ][ k ]* and a BitRate (either indicated in the VPS, SPS, or inferred) that is greater than or equal to SubpicBitRateVcl[[[i]][j]] *[ spLvIdx ][ j ][ k ]* and SubpicBitRateNal[[[i]][j]] *[ spLvIdx ][ j ][ k ], where spLvIdx is equal to SubpicLevelIdx[ j ][ k ]*.

Figure 5:
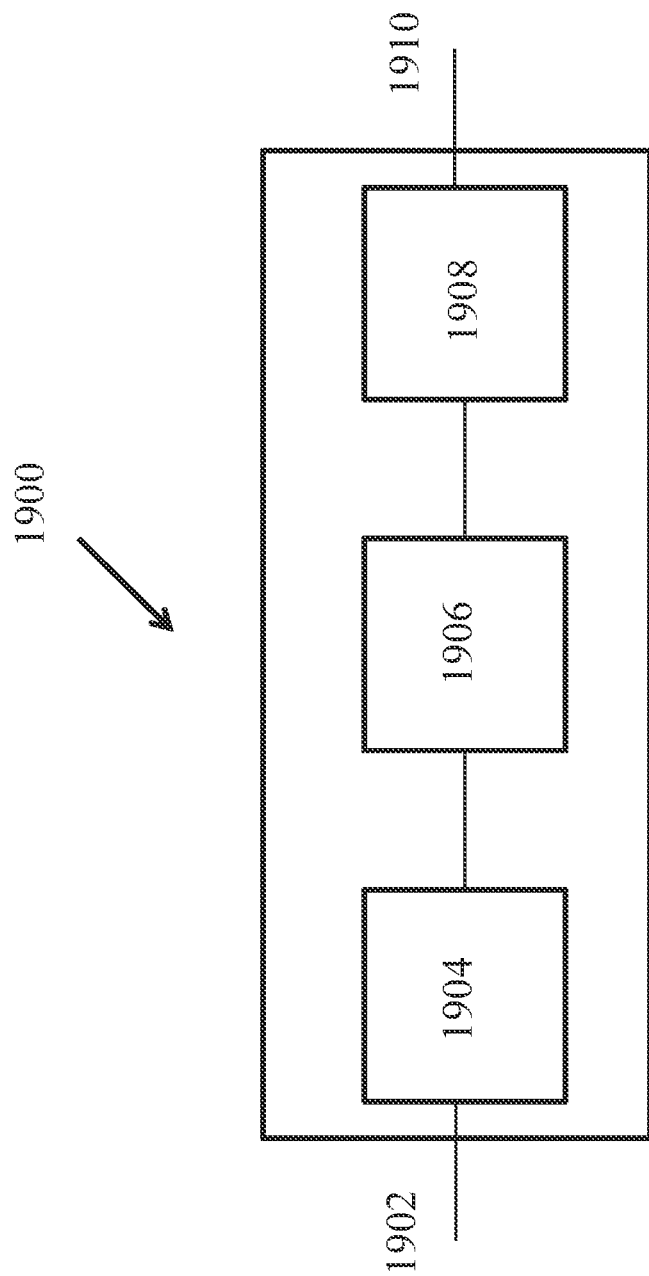
FIG. 5 is a block diagram of an example video processing system.

FIG. 5 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1900 may include a coding component 1904 that may implement the various coding or encoding methods described in the present disclosure. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 6:
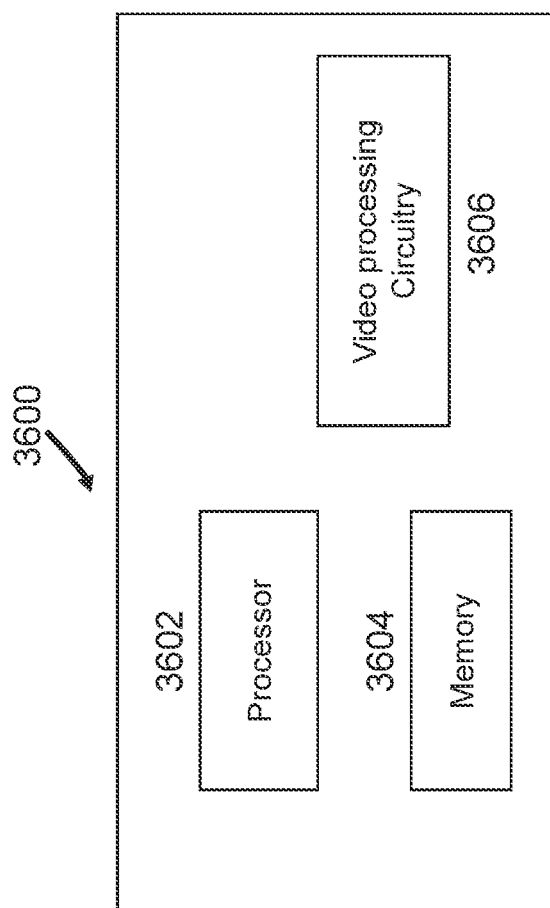
FIG. 6 is a block diagram of a video processing apparatus.

FIG. 6 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present disclosure. The memory (memories) 3604 may be used for storing data and code used for implementing the methods and techniques described herein. The video processing hardware 3606 may be used to implement, in hardware circuitry, some techniques described in the present disclosure.

Figure 8:
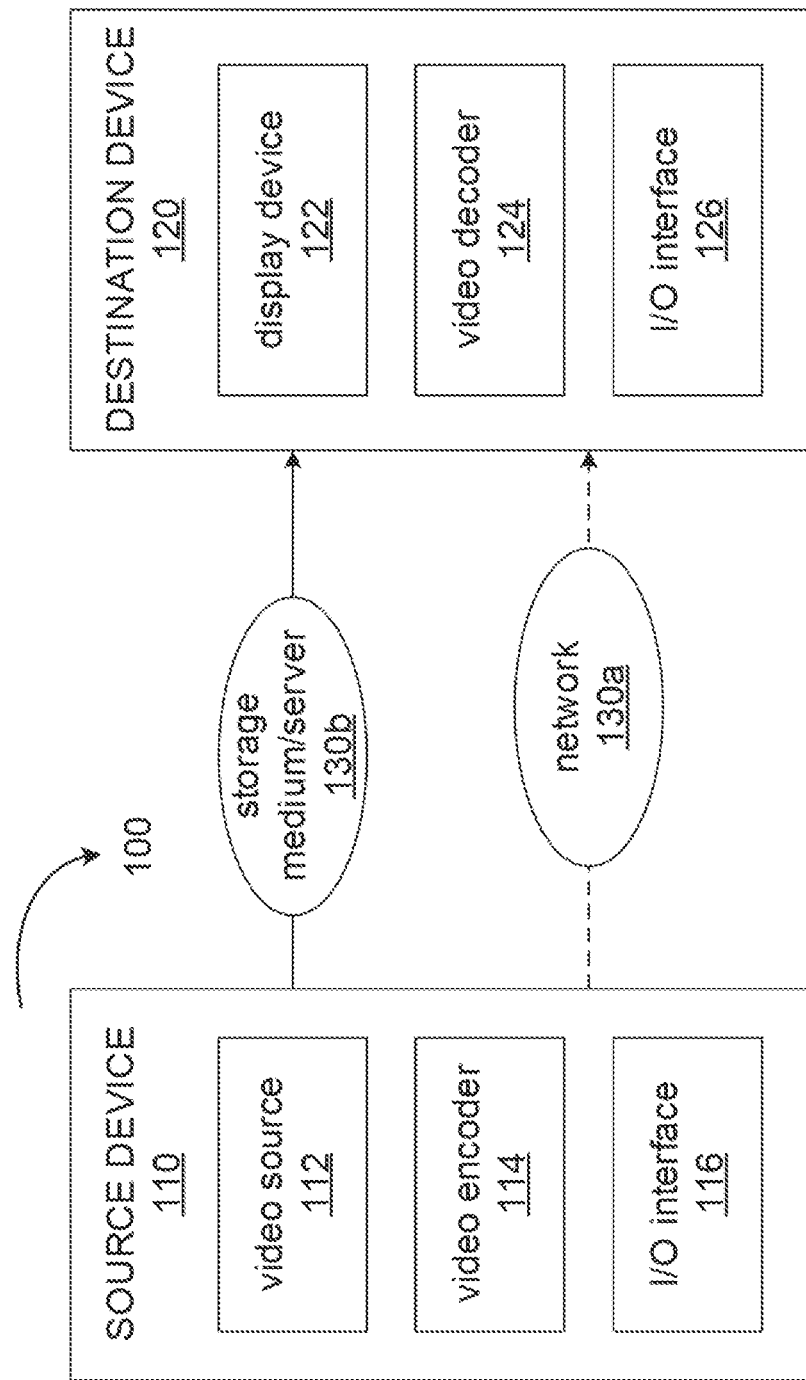
FIG. 8 is a block diagram that illustrates a video coding system in accordance with some embodiments of the present disclosure.

FIG. 8 is a block diagram that illustrates an example video coding system 100 that may utilize the techniques of this disclosure.

As shown in FIG. 8, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130*a*. The encoded video data may also be stored onto a storage medium/server 130*b* for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 9:
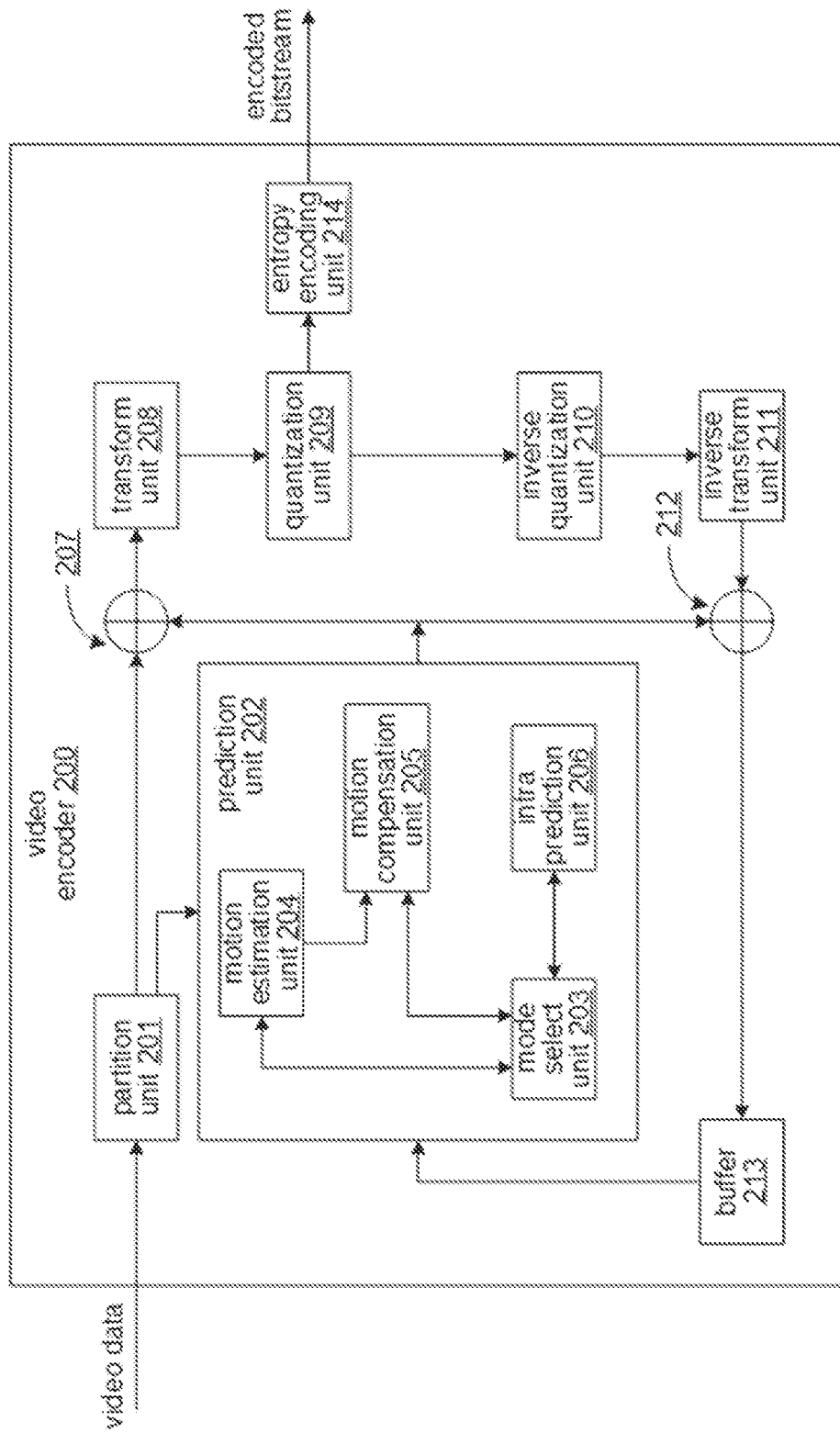
FIG. 9 is a block diagram that illustrates an encoder in accordance with some embodiments of the present disclosure.

FIG. 9 is a block diagram illustrating an example of video encoder 200, which may be video encoder 114 in the system 100 illustrated in FIG. 8.

Video encoder 200 may be configured to perform any or all of the techniques of this disclosure. In the example of FIG. 9, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 9 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 10:
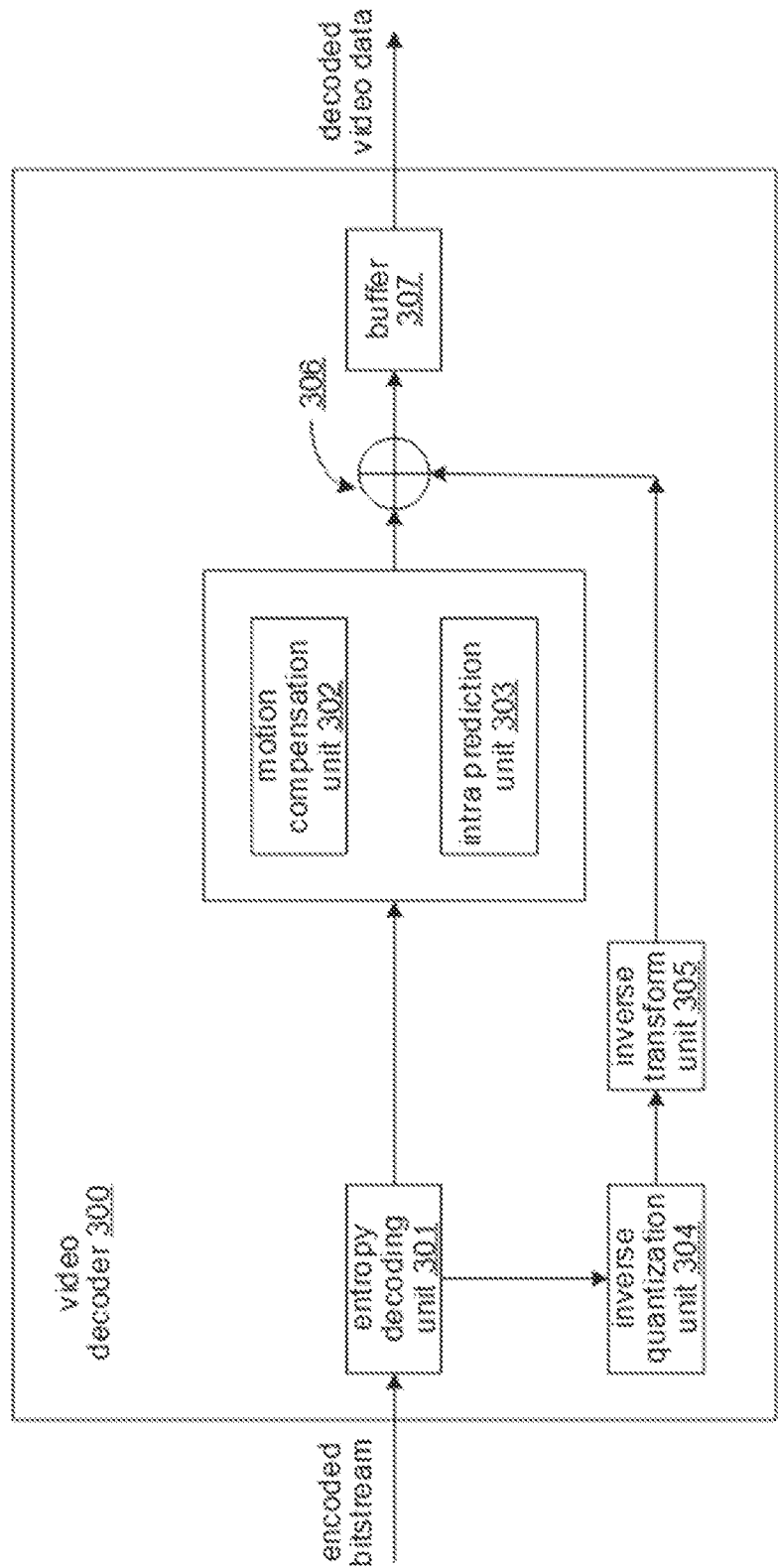
FIG. 10 is a block diagram that illustrates a decoder in accordance with some embodiments of the present disclosure.

FIG. 10 is a block diagram illustrating an example of video decoder 300 which may be video decoder 124 in the system 100 illustrated in FIG. 8.

The video decoder 300 may be configured to perform any or all of the techniques of this disclosure. In the example of FIG. 10, the video decoder 300 includes a plurality of functional components. The techniques described in this disclosure may be shared among the various components of the video decoder 300. In some examples, a processor may be configured to perform any or all of the techniques described in this disclosure.

In the example of FIG. 10, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 9).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 304 applies an inverse transform.

Reconstruction unit 306 may sum the residual blocks with the corresponding prediction blocks generated by motion compensation unit 302 or intra-prediction unit 305 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions preferred by some embodiments is provided next.

The following solutions show example embodiments of techniques discussed in the previous section (e.g., item 1).

Figure 7:
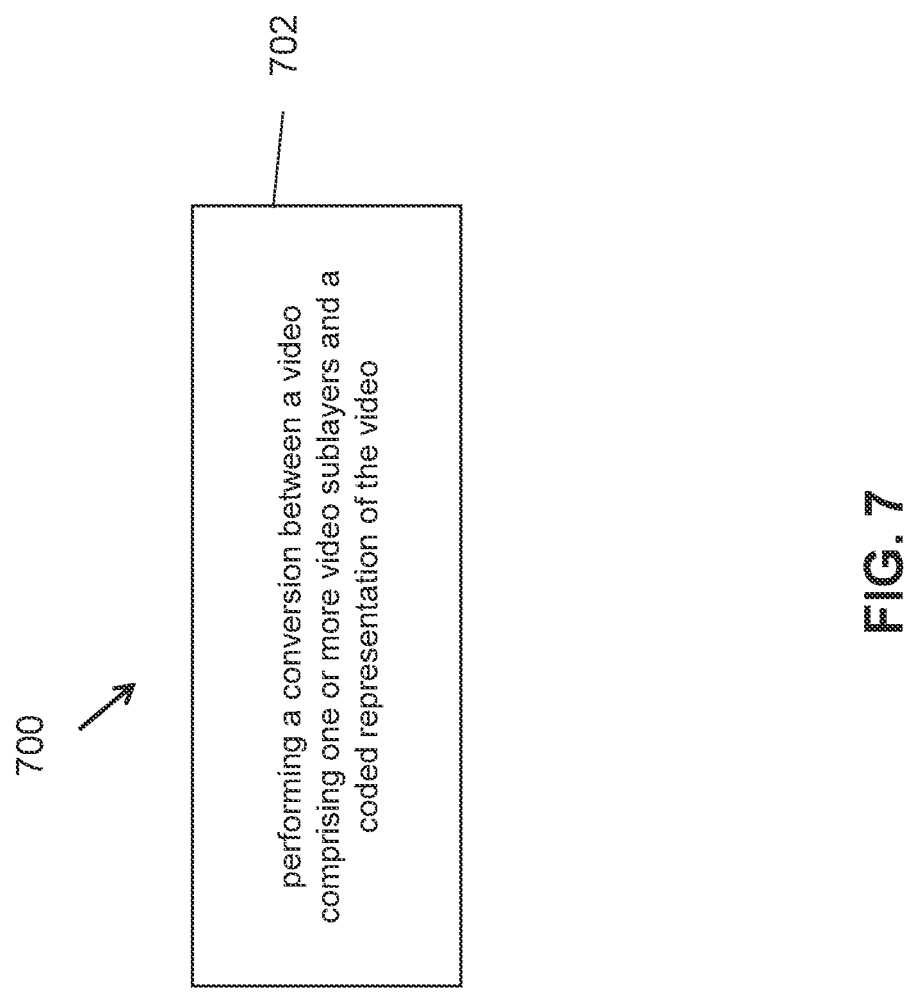
FIG. 7 is a flowchart for an example method of video processing.

1. A video processing method (e.g., method 700 shown in FIG. 7), comprising: performing (702) a conversion between a video comprising one or more video sublayers and a coded representation of the video, wherein the coded representation conforms to a format rule; wherein the format rule specifies to include a syntax structure that loops over a number of sublayers in the coded representation and one or more syntax fields indicative of each sublayer included in the syntax structure, wherein the syntax structure includes information about signaled fractions and reference level indicators.

2. The method of solution 1, wherein the format rule specifies that a particular fraction not explicitly included in the syntax structure is interpreted to have same values as a next higher sublayer.

The following solutions show example embodiments of techniques discussed in the previous section (e.g., items 2, 5, 6).

3. A method of video processing, comprising: performing a conversion between a video comprising one or more subpictures and a coded representation of the video, wherein the conversion uses or produces supplemental enhancement information for one or more subpicture level information.

4. The method of solution 3, wherein the supplemental enhancement information is included in the coded representation.

5. The method of solution 3, wherein the supplemental enhancement information is excluded from the coded representation and communicated between an encoding end a decoding end using a mechanism different from the coded representation.

6. The method of solution 4, wherein the coded representation conforms to a format rule that specifies that a same value is signaled in each sequence parameter set indicative of a number of subpictures in layers that have multiple subpictures per picture.

7. The method of any of solutions 1 to 6, wherein the conversion comprises encoding the video into the coded representation.

8. The method of any of solutions 1 to 6, wherein the conversion comprises decoding the coded representation to generate pixel values of the video.

9. A video decoding apparatus comprising a processor configured to implement a method recited in one or more of solutions 1 to 8.

10. A video encoding apparatus comprising a processor configured to implement a method recited in one or more of solutions 1 to 8.

11. A computer program product having computer code stored thereon, the code, when executed by a processor, causes the processor to implement a method recited in any of solutions 1 to 8.

12. A method, apparatus or system described in the present disclosure.

Figure 13:
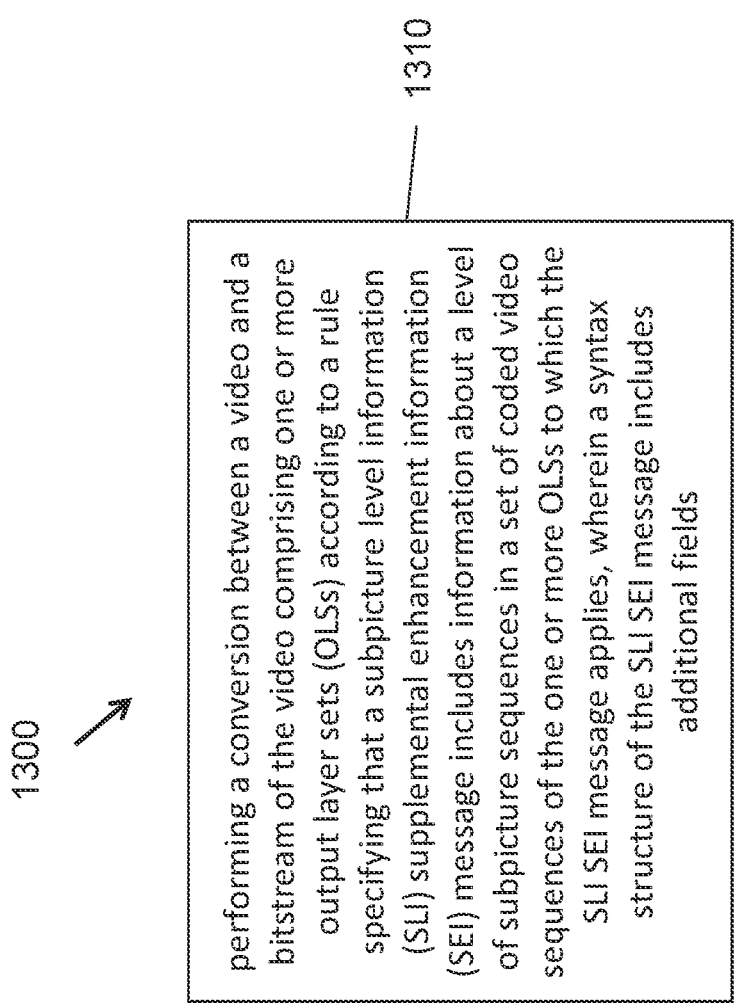
FIG. 13 is a flow chart representation of a method of processing video data in accordance with one or more embodiments of the present technology.

FIG. 13 is a flow chart representation of a method 1300 of processing video data in accordance with one or more embodiments of the present technology. The method 1300 includes, at operation 1310, performing a conversion between a video and a bitstream of the video comprising one or more output layer sets (OLSs) according to a rule. The rule specifies that a subpicture level information (SLI) supplemental enhancement information (SEI) message includes information about a level of subpicture sequences in a set of coded video sequences of the one or more OLSs to which the SLI SEI message applies. A syntax structure of the SLI SEI message includes (1) a first syntax element specifying a maximum number of sublayers for the subpicture sequences, (2) a second syntax element specifying whether level information for the subpicture sequences is present for one or more sublayer representations, and (3) a loop for a number of sublayers each associated with a fraction of a bitstream level limit and a level indicator indicating a level to which each subpicture sequence conforms.

In some embodiments, a value of the first syntax element is in a range of 0 to a maximum number of sublayers minus 1 indicated in a video parameter set. In some embodiments, the second syntax element is inferred to be 0 in response to the second syntax element not being present in the bitstream. In some embodiments, in response to the fraction of the bitstream level limit associated with a sublayer k not being present, the fraction is inferred to be equal to the fraction associated with a sublayer k+1. In some embodiments, in response to the level indicator associated with a sublayer k is not present, the level indicator is inferred to be equal to the level indicator associated with a sublayer k+1.

In some embodiments, the syntax structure further includes, for each sublayer, a third syntax element specifying a fraction of the bitstream level limit associated with the level indicator. In response to the third syntax element associated with a sublayer k is not present, the third syntax element is inferred to be equal to the syntax element associated with a sublayer k+1. In some embodiments, the syntax structure further includes a fourth syntax element specifying a number of reference levels signaled for each of the subpicture sequences. In some embodiments, the syntax structure further includes a fifth syntax element specifying whether a hypothetical stream scheduler (HSS) operates in an intermittent bit rate mode or constant bit rate (CBR) mode for a subpicture sequence.

FIG. 14 is a flow chart representation of a method 1400 of processing video data in accordance with one or more embodiments of the present technology. The method 1400 includes, at operation 1410, performing a conversion between a current access unit of a video comprising one or more output layer sets (OLSs) and a bitstream of the video according to a rule. The rule specifies that a subpicture level information (SLI) supplemental enhancement information (SEI) message includes information about a level of subpicture sequences in a set of coded video sequences of the one or more OLSs to which the SLI SEI message applies. The SLI SEI message remains persistent in a decoding order from the current access unit until an end of the bitstream or until a next access unit containing a subsequent SLI SEI message that includes different content than the SLI SEI message.

In some embodiments, the rule specifies that all SLI SEI messages applicable to a same CVS have the same content. In some embodiments, the SLI SEI message is present for the current access unit by either being in the bitstream or provided through an external means. In some embodiments, a first variable indicating a subpicture level indicator is specified to include values for each of the subpicture sequences. In some embodiments, a second variable indicating a subpicture level index is specified to include values for each of the subpicture sequences.

Figure 15:
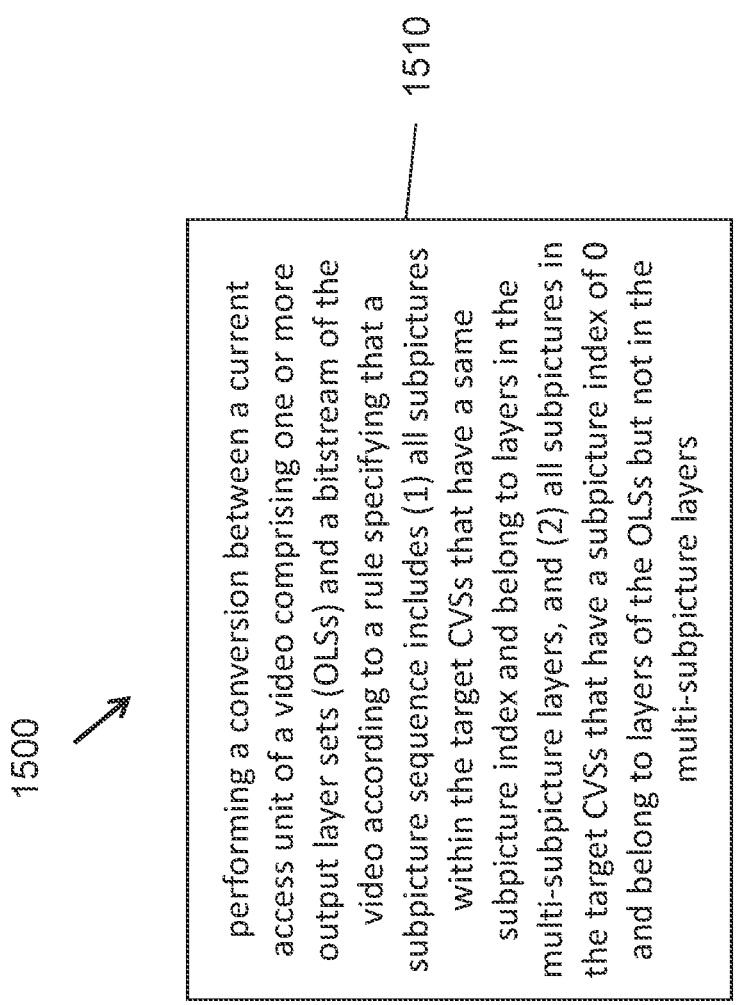
FIG. 15 is a flow chart representation of yet another method of processing video data in accordance with one or more embodiments of the present technology.

FIG. 15 is a flow chart representation of a method 1500 of processing video data in accordance with one or more embodiments of the present technology. The method 1500 includes, at operation 1510, performing a conversion between a current access unit of a video comprising one or more output layer sets (OLSs) and a bitstream of the video according to a rule. A subpicture level information (SLI) supplemental enhancement information (SEI) message includes information about a level of subpicture sequences in a set of coded video sequences of the one or more OLSs to which the SLI SEI message applies. Layers in the one or more OLSs for which a variable in a referenced sequence parameter set indicating that a number of subpictures is greater than 1 are referred to as multi-subpicture layers. Coded video sequences in the set of the OLSs are referred to as target coded video sequences (CVSs). The rule specifies that a subpicture sequence includes (1) all subpictures within the target CVSs that have a same subpicture index and belong to layers in the multi-subpicture layers, and (2) all subpictures in the target CVSs that have a subpicture index of 0 and belong to layers of the OLSs but not in the multi-subpicture layers.

In some embodiments, the bitstream confirms to a formatting rule specifying that, in response to the SLI SEI message being present for a coded video sequence, all sequence parameter sets referenced by pictures in the multi-subpicture layers have a same number of subpictures. In some embodiments, in response to the SLI SEI message being present for any access unit of a coded video sequence (CVS) of the one or more OLSs, the rule specifies that the SLI SEI message is present for a first access unit of the CVS. In some embodiments, a syntax element in a syntax structure of the SLI SEI message specifies a number of subpictures in a picture in the multi-subpicture layers in the target CVSs.

In some embodiments, the conversion comprises encoding the video into the bitstream. In some embodiments, the conversion comprises decoding the video from the bitstream.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

The invention claimed is:

1. A method of processing video data, comprising:
performing a conversion between a video and a bitstream of the video comprising one or more output layer sets (OLSs) according to a rule,
wherein the rule specifies that a subpicture level information (SLI) supplemental enhancement information (SEI) message includes information about a level of subpicture sequences in a set of coded video sequences of the one or more OLSs to which the SLI SEI message applies, and wherein a syntax structure of the SLI SEI message includes (1) a first syntax element specifying a maximum number of temporal sublayers in the subpicture sequences, (2) a second syntax element specifying whether level information for the subpicture sequences is present for one or more sublayer representations, and (3) a loop for a number of sublayers each associated with a fraction of a bitstream level limit and a level indicator indicating a level to which each subpicture sequence conforms, and
wherein the second syntax element equal to 1 specifies that the level information for the subpicture sequences is present for the one or more sublayer representations in a range of 0 to a value of the first syntax element, inclusive, and the second syntax element equal to 0 specifies that the level information for the subpicture sequences is present for (the value of the first syntax element)-th sublayer representation.

2. The method of claim 1, wherein the second syntax element is inferred to be 0 in response to the second syntax element not being present in the bitstream.

3. The method of claim 1, wherein, in response to the fraction of the bitstream level limit associated with a sublayer k being not present and k being less than a value of the first syntax element, the fraction is inferred to be equal to the fraction associated with a sublayer k+1.

4. The method of claim 1, wherein, in response to the level indicator associated with a sublayer k being not present and k being less than a value of the first syntax element, the level indicator is inferred to be equal to the level indicator associated with a sublayer k+1.

5. The method of claim 1, wherein the syntax structure further includes, for each sublayer, a third syntax element specifying a fraction of the bitstream level limit associated with the level indicator, and wherein, in response to the third syntax element associated with a sublayer k being not present and k being less than a value of the first syntax element, the third syntax element is inferred to be equal to a syntax element associated with a sublayer k+1.

6. The method of claim 1, wherein the syntax structure further includes a fourth syntax element specifying a number of reference levels signaled for each of the subpicture sequences.

7. The method of claim 1, wherein the syntax structure further includes a fifth syntax element specifying whether a hypothetical stream scheduler (HSS) operates in an intermittent bit rate mode or constant bit rate (CBR) mode for a subpicture sequence.

8. The method of claim 1, wherein the conversion comprises encoding the video into the bitstream.

9. The method of claim 1, wherein the conversion comprises decoding the video from the bitstream.

10. An apparatus for processing video data comprising a processor and a non-transitory memory with instructions thereon, wherein the instructions upon execution by the processor, cause the processor to:
perform a conversion between a video and a bitstream of the video comprising one or more output layer sets (OLSs) according to a rule,
wherein the rule specifies that a subpicture level information (SLI) supplemental enhancement information (SEI) message includes information about a level of subpicture sequences in a set of coded video sequences of the one or more OLSs to which the SLI SEI message applies, and wherein a syntax structure of the SLI SEI message includes (1) a first syntax element specifying a maximum number of temporal sublayers in the subpicture sequences, (2) a second syntax element specifying whether level information for the subpicture sequences is present for one or more sublayer representations, and (3) a loop for a number of sublayers each associated with a fraction of a bitstream level limit and a level indicator indicating a level to which each subpicture sequence conforms, and
wherein the second syntax element equal to 1 specifies that the level information for the subpicture sequences is present for the one or more sublayer representations in a range of 0 to a value of the first syntax element, inclusive, and the second syntax element equal to 0 specifies that the level information for the subpicture sequences is present for (the value of the first syntax element)-th sublayer representation.

11. The apparatus of claim 10,
wherein the second syntax element is inferred to be 0 in response to the second syntax element not being present in the bitstream.

12. The apparatus of claim 10, wherein, in response to the fraction of the bitstream level limit associated with a sublayer k being not present and k being less than a value of the first syntax element, the fraction is inferred to be equal to the fraction associated with a sublayer k+1, and wherein, in response to the level indicator associated with a sublayer k being not present and k being less than a value of the first syntax element, the level indicator is inferred to be equal to the level indicator associated with a sublayer k+1.

13. The apparatus of claim 10, wherein the syntax structure further includes, for each sublayer, a third syntax element specifying a fraction of the bitstream level limit associated with the level indicator, and wherein, in response to the third syntax element associated with a sublayer k being not present and k being less than a value of the first syntax element, the third syntax element is inferred to be equal to a syntax element associated with a sublayer k+1.

14. The apparatus of claim 10, wherein the syntax structure further includes a fourth syntax element specifying a number of reference levels signaled for each of the subpicture sequences.

15. The apparatus of claim 10, wherein the syntax structure further includes a fifth syntax element specifying whether a hypothetical stream scheduler (HSS) operates in an intermittent bit rate mode or constant bit rate (CBR) mode for a subpicture sequence.

16. A non-transitory computer-readable storage medium storing instructions that cause a processor to:
perform a conversion between a video and a bitstream of the video comprising one or more output layer sets (OLSs) according to a rule,
wherein the rule specifies that a subpicture level information (SLI) supplemental enhancement information (SEI) message includes information about a level of subpicture sequences in a set of coded video sequences of the one or more OLSs to which the SLI SEI message applies, and wherein a syntax structure of the SLI SEI message includes (1) a first syntax element specifying a maximum number of temporal sublayers in the subpicture sequences, (2) a second syntax element specifying whether level information for the subpicture sequences is present for one or more sublayer representations, and (3) a loop for a number of sublayers each associated with a fraction of a bitstream level limit and a level indicator indicating a level to which each subpicture sequence conforms, and
wherein the second syntax element equal to 1 specifies that the level information for the subpicture sequences is present for the one or more sublayer representations in a range of 0 to a value of the first syntax element, inclusive, and the second syntax element equal to 0 specifies that the level information for the subpicture sequences is present for (the value of the first syntax element)-th sublayer representation.

17. The non-transitory computer-readable storage medium of claim 16,
wherein the second syntax element is inferred to be 0 in response to the second syntax element not being present in the bitstream,
wherein, in response to the fraction of the bitstream level limit associated with a sublayer k being not present and k being less than a value of the first syntax element, the fraction is inferred to be equal to the fraction associated with a sublayer k+1,
wherein, in response to the level indicator associated with a sublayer k being not present and k being less than a value of the first syntax element, the level indicator is inferred to be equal to the level indicator associated with a sublayer k+1,
wherein the syntax structure further includes, for each sublayer, a third syntax element specifying a fraction of the bitstream level limit associated with the level indicator, and wherein, in response to the third syntax element associated with a sublayer k being not present and k being less than a value of the first syntax element, the third syntax element is inferred to be equal to a syntax element associated with a sublayer k+1,
wherein the syntax structure further includes a fourth syntax element specifying a number of reference levels signaled for each of the subpicture sequences, and
wherein the syntax structure further includes a fifth syntax element specifying whether a hypothetical stream scheduler (HSS) operates in an intermittent bit rate mode or constant bit rate (CBR) mode for a subpicture sequence.

18. A non-transitory computer-readable recording medium storing a bitstream of a video which is generated by a method performed by a video processing apparatus, wherein the method comprises:
generating the bitstream of the video from the video comprising one or more output layer sets (OLSs) according to a rule, and
wherein the rule specifies that a subpicture level information (SLI) supplemental enhancement information (SEI) message includes information about a level of subpicture sequences in a set of coded video sequences of the one or more OLSs to which the SLI SEI message applies, and wherein a syntax structure of the SLI SEI message includes (1) a first syntax element specifying a maximum number of temporal sublayers in the subpicture sequences, (2) a second syntax element specifying whether level information for the subpicture sequences is present for one or more sublayer representations, and (3) a loop for a number of sublayers each associated with a fraction of a bitstream level limit and a level indicator indicating a level to which each subpicture sequence conforms, and
wherein the second syntax element equal to 1 specifies that the level information for the subpicture sequences is present for the one or more sublayer representations in a range of 0 to a value of the first syntax element, inclusive, and the second syntax element equal to 0 specifies that the level information for the subpicture sequences is present for (the value of the first syntax element)-th sublayer representation.

19. The non-transitory computer-readable recording medium of claim 18,
wherein the second syntax element is inferred to be 0 in response to the second syntax element not being present in the bitstream,
wherein, in response to the fraction of the bitstream level limit associated with a sublayer k being not present and k being less than a value of the first syntax element, the fraction is inferred to be equal to the fraction associated with a sublayer k+1,
wherein, in response to the level indicator associated with a sublayer k being not present and k being less than a value of the first syntax element, the level indicator is inferred to be equal to the level indicator associated with a sublayer k+1,
wherein the syntax structure further includes, for each sublayer, a third syntax element specifying a fraction of the bitstream level limit associated with the level indicator, and wherein, in response to the third syntax element associated with a sublayer k being not present and k being less than a value of the first syntax element, the third syntax element is inferred to be equal to a syntax element associated with a sublayer k+1,
wherein the syntax structure further includes a fourth syntax element specifying a number of reference levels signaled for each of the subpicture sequences, and
wherein the syntax structure further includes a fifth syntax element specifying whether a hypothetical stream scheduler (HSS) operates in an intermittent bit rate mode or constant bit rate (CBR) mode for a subpicture sequence.

* * * * *